United States Patent
Baum et al.

(10) Patent No.: US 8,478,844 B2
(45) Date of Patent: *Jul. 2, 2013

(54) FORMING A SECURITY NETWORK INCLUDING INTEGRATED SECURITY SYSTEM COMPONENTS AND NETWORK DEVICES

(75) Inventors: Marc Baum, San Jose, CA (US); Paul J. Dawes, Woodside, CA (US); Mike Kinney, Foster City, CA (US); Reza Raji, Menlo Park, CA (US); David Swenson, Glyndon, MN (US); Aaron Wood, Boulder Creek, CA (US)

(73) Assignee: iControl Networks, Inc., Redwood City, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 12/189,788

(22) Filed: Aug. 12, 2008

(65) Prior Publication Data

US 2009/0077624 A1    Mar. 19, 2009

Related U.S. Application Data

(60) Division of application No. 12/189,757, filed on Aug. 11, 2008, and a continuation-in-part of application No. 11/084,232, filed on Mar. 16, 2005, (Continued)

(51) Int. Cl.
*G06F 15/177* (2006.01)
(52) U.S. Cl.
USPC ........... 709/220; 709/201; 709/202; 709/203; 709/224; 709/225; 709/227; 717/101; 717/102; 707/203; 718/101; 726/1; 706/46

(58) Field of Classification Search
USPC .. 709/201, 202, 203, 224, 225, 227; 717/101, 717/102; 707/203; 718/101; 726/1; 706/46
See application file for complete search history.

(56) References Cited

U.S. PATENT DOCUMENTS

| 4,754,261 | A | 6/1988 | Marino |
| 4,779,007 | A | 10/1988 | Schlanger et al. |

(Continued)

FOREIGN PATENT DOCUMENTS

| WO | WO 89/07855 | 8/1989 |
| WO | WO 01/52478 | 7/2001 |

(Continued)

OTHER PUBLICATIONS

Form PCT/ISA/220, "PCT Notification of Transmittal of The International Search Report and the Written Opinion of the International Searching Authority, or the Declaration," 1 pg.

(Continued)

*Primary Examiner* — John Follansbee
*Assistant Examiner* — Anthony Mejia
(74) *Attorney, Agent, or Firm* — Gregory & Sawrie LLP

(57) ABSTRACT

An integrated security system is described that integrates broadband and mobile access and control with conventional security systems and premise devices to provide a tri-mode security network (broadband, cellular/GSM, POTS access) that enables users to remotely stay connected to their premises. The integrated security system, while delivering remote premise monitoring and control functionality to conventional monitored premise protection, complements existing premise protection equipment. The integrated security system integrates into the premise network and couples wirelessly with the conventional security panel, enabling broadband access to premise security systems. Automation devices (cameras, lamp modules, thermostats, etc.) can be added, enabling users to remotely see live video and/or pictures and control home devices via their personal web portal or webpage, mobile phone, and/or other remote client device. Users can also receive notifications via email or text message when happenings occur, or do not occur, in their home.

50 Claims, 13 Drawing Sheets

Related U.S. Application Data now Pat. No. 8,335,842, and a continuation-in-part of application No. 11/761,718, filed on Jun. 12, 2007, now Pat. No. 7,711,796, and a continuation-in-part of application No. 11/761,745, filed on Jun. 12, 2007, and a continuation-in-part of application No. 12/019,554, filed on Jan. 24, 2008, now Pat. No. 7,911,341, and a continuation-in-part of application No. 12/019,568, filed on Jan. 24, 2008.

(60) Provisional application No. 60/957,997, filed on Aug. 24, 2007, provisional application No. 60/968,005, filed on Aug. 24, 2007, provisional application No. 60/987,359, filed on Nov. 12, 2007, provisional application No. 60/987,366, filed on Nov. 12, 2007, provisional application No. 61/019,162, filed on Jan. 4, 2008, provisional application No. 61/019,167, filed on Jan. 4, 2008, provisional application No. 61/023,489, filed on Jan. 25, 2008, provisional application No. 61/023,493, filed on Jan. 25, 2008, provisional application No. 61/023,496, filed on Jan. 25, 2008, provisional application No. 61/087,967, filed on Aug. 11, 2008.

(56) References Cited

U.S. PATENT DOCUMENTS

| | | | | |
|---|---|---|---|---|
| 4,833,449 | A | 5/1989 | Gaffigan | |
| 4,860,185 | A | 8/1989 | Brewer et al. | |
| 4,993,059 | A | 2/1991 | Smith et al. | |
| 5,086,385 | A | 2/1992 | Launey et al. | |
| 5,519,878 | A | 5/1996 | Dolin, Jr. | |
| 5,579,197 | A | 11/1996 | Mengelt et al. | |
| 5,623,601 | A * | 4/1997 | Vu | 726/12 |
| 5,907,279 | A | 5/1999 | Bruins et al. | |
| 5,963,916 | A | 10/1999 | Kaplan | |
| D416,910 | S | 11/1999 | Vasquez | |
| 5,991,795 | A | 11/1999 | Howard et al. | |
| 6,037,991 | A | 3/2000 | Thro et al. | |
| 6,052,052 | A | 4/2000 | Delmonaco | |
| 6,060,994 | A | 5/2000 | Chen | |
| 6,134,591 | A | 10/2000 | Nickles | |
| 6,138,249 | A * | 10/2000 | Nolet | 714/25 |
| 6,140,987 | A | 10/2000 | Stein et al. | |
| 6,192,418 | B1 * | 2/2001 | Hale et al. | 719/312 |
| 6,198,479 | B1 | 3/2001 | Humpleman et al. | |
| 6,219,677 | B1 | 4/2001 | Howard | |
| 6,281,790 | B1 | 8/2001 | Kimmel et al. | |
| 6,286,038 | B1 | 9/2001 | Reichmeyer et al. | |
| 6,288,716 | B1 | 9/2001 | Humpleman et al. | |
| D451,529 | S | 12/2001 | Vasquez | |
| 6,331,122 | B1 | 12/2001 | Wu | |
| 6,351,829 | B1 | 2/2002 | Dupont et al. | |
| 6,353,891 | B1 * | 3/2002 | Borella et al. | 726/12 |
| 6,363,417 | B1 | 3/2002 | Howard et al. | |
| 6,370,436 | B1 | 4/2002 | Howard et al. | |
| 6,377,861 | B1 | 4/2002 | York | |
| 6,385,772 | B1 | 5/2002 | Courtney | |
| 6,400,265 | B1 | 6/2002 | Saylor et al. | |
| D464,328 | S | 10/2002 | Vasquez et al. | |
| D464,948 | S | 10/2002 | Vasquez et al. | |
| 6,462,507 | B2 | 10/2002 | Fisher, Jr. | |
| 6,462,663 | B1 | 10/2002 | Wilson et al. | |
| 6,467,084 | B1 | 10/2002 | Howard et al. | |
| 6,480,901 | B1 | 11/2002 | Weber et al. | |
| 6,493,020 | B1 | 12/2002 | Stevenson et al. | |
| 6,496,927 | B1 | 12/2002 | McGrane | |
| 6,529,723 | B1 | 3/2003 | Bentley | |
| 6,542,075 | B2 | 4/2003 | Barker et al. | |
| 6,563,800 | B1 | 5/2003 | Salo et al. | |
| 6,574,234 | B1 | 6/2003 | Myer et al. | |
| 6,580,950 | B1 | 6/2003 | Johnson et al. | |
| 6,587,736 | B2 | 7/2003 | Howard et al. | |
| 6,591,094 | B1 | 7/2003 | Bentley | |
| 6,601,086 | B1 | 7/2003 | Howard et al. | |
| 6,609,127 | B1 | 8/2003 | Lee et al. | |
| 6,615,088 | B1 | 9/2003 | Myer et al. | |
| 6,621,827 | B1 | 9/2003 | Rezvani et al. | |
| 6,643,652 | B2 * | 11/2003 | Helgeson et al. | 1/1 |
| 6,643,669 | B1 | 11/2003 | Novak et al. | |
| 6,648,682 | B1 | 11/2003 | Wu | |
| 6,658,091 | B1 | 12/2003 | Naidoo et al. | |
| 6,661,340 | B1 | 12/2003 | Saylor et al. | |
| 6,686,838 | B1 * | 2/2004 | Rezvani et al. | 340/506 |
| 6,690,411 | B2 | 2/2004 | Naidoo et al. | |
| 6,693,545 | B2 | 2/2004 | Brown et al. | |
| 6,721,689 | B2 | 4/2004 | Markle et al. | |
| 6,721,747 | B2 * | 4/2004 | Lipkin | 709/209 |
| 6,738,824 | B1 | 5/2004 | Blair | |
| 6,756,998 | B1 * | 6/2004 | Bilger | 715/764 |
| 6,778,085 | B2 | 8/2004 | Faulkner et al. | |
| 6,781,509 | B1 | 8/2004 | Oppedahl et al. | |
| 6,789,147 | B1 | 9/2004 | Kessler et al. | |
| 6,795,322 | B2 | 9/2004 | Aihara et al. | |
| 6,798,344 | B2 | 9/2004 | Faulkner et al. | |
| 6,826,233 | B1 | 11/2004 | Oosawa | |
| 6,865,690 | B2 | 3/2005 | Kocin | |
| 6,891,838 | B1 | 5/2005 | Petite et al. | |
| 6,912,429 | B1 | 6/2005 | Bilger | |
| 6,928,148 | B2 | 8/2005 | Simon et al. | |
| 6,930,599 | B2 | 8/2005 | Naidoo et al. | |
| 6,930,730 | B2 | 8/2005 | Maxon et al. | |
| 6,931,445 | B2 * | 8/2005 | Davis | 709/224 |
| 6,943,681 | B2 | 9/2005 | Rezvani et al. | |
| 6,959,393 | B2 * | 10/2005 | Hollis et al. | 726/21 |
| 6,963,981 | B1 * | 11/2005 | Bailey et al. | 726/22 |
| 6,965,313 | B1 | 11/2005 | Saylor et al. | |
| 6,970,183 | B1 | 11/2005 | Monroe | |
| 6,972,676 | B1 | 12/2005 | Kimmel et al. | |
| 6,975,220 | B1 | 12/2005 | Foodman et al. | |
| 6,990,591 | B1 | 1/2006 | Pearson | |
| 7,015,806 | B2 * | 3/2006 | Naidoo et al. | 340/531 |
| 7,016,970 | B2 | 3/2006 | Harumoto et al. | |
| 7,024,676 | B1 | 4/2006 | Klopfenstein | |
| 7,030,752 | B2 | 4/2006 | Tyroler | |
| 7,032,002 | B1 | 4/2006 | Rezvani et al. | |
| 7,034,681 | B2 | 4/2006 | Yamamoto et al. | |
| 7,039,391 | B2 | 5/2006 | Rezvani et al. | |
| 7,043,537 | B1 * | 5/2006 | Pratt | 709/220 |
| 7,047,088 | B2 | 5/2006 | Nakamura et al. | |
| 7,047,092 | B2 | 5/2006 | Wimsatt | |
| 7,072,934 | B2 * | 7/2006 | Helgeson et al. | 709/203 |
| 7,079,020 | B2 | 7/2006 | Stilp | |
| 7,080,046 | B1 | 7/2006 | Rezvani et al. | |
| 7,085,937 | B1 | 8/2006 | Rezvani et al. | |
| 7,099,944 | B1 * | 8/2006 | Anschutz et al. | 709/227 |
| 7,099,994 | B2 | 8/2006 | Anschultz | |
| 7,103,152 | B2 | 9/2006 | Naidoo et al. | |
| 7,106,176 | B2 | 9/2006 | La et al. | |
| 7,107,322 | B1 * | 9/2006 | Freeny, Jr. | 709/217 |
| 7,113,090 | B1 | 9/2006 | Saylor et al. | |
| 7,113,099 | B2 | 9/2006 | Tyroler et al. | |
| 7,120,232 | B2 | 10/2006 | Naidoo et al. | |
| 7,120,233 | B2 | 10/2006 | Naidoo et al. | |
| 7,130,383 | B2 | 10/2006 | Naidoo et al. | |
| 7,130,585 | B1 | 10/2006 | Ollis et al. | |
| 7,148,810 | B2 | 12/2006 | Bhat | |
| 7,149,798 | B2 | 12/2006 | Rezvani et al. | |
| 7,149,814 | B2 * | 12/2006 | Neufeld et al. | 709/248 |
| 7,164,907 | B2 * | 1/2007 | Cochran et al. | 455/419 |
| 7,174,564 | B1 * | 2/2007 | Weatherspoon et al. | 726/2 |
| 7,183,907 | B2 | 2/2007 | Simon et al. | |
| 7,203,486 | B2 | 4/2007 | Patel | |
| 7,218,217 | B2 | 5/2007 | Adonailo et al. | |
| 7,222,359 | B2 * | 5/2007 | Freund et al. | 726/3 |
| 7,237,267 | B2 * | 6/2007 | Rayes et al. | 726/25 |
| 7,249,317 | B1 * | 7/2007 | Nakagawa et al. | 715/209 |
| 7,250,854 | B2 | 7/2007 | Rezvani et al. | |
| 7,254,779 | B1 | 8/2007 | Rezvani et al. | |
| 7,262,690 | B2 | 8/2007 | Heaton et al. | |
| 7,305,461 | B2 * | 12/2007 | Ullman | 709/223 |
| 7,337,217 | B2 * | 2/2008 | Wang | 709/217 |
| 7,337,473 | B2 * | 2/2008 | Chang et al. | 726/27 |

| Patent/Pub No. | Date | Name | Ref |
|---|---|---|---|
| 7,343,619 B2 * | 3/2008 | Ofek et al. | 726/2 |
| 7,349,761 B1 | 3/2008 | Cruse | |
| 7,349,967 B2 * | 3/2008 | Wang | 709/227 |
| 7,367,045 B2 * | 4/2008 | Ofek et al. | 726/2 |
| 7,370,115 B2 | 5/2008 | Bae et al. | |
| 7,383,339 B1 * | 6/2008 | Meenan et al. | 709/227 |
| 7,403,838 B2 * | 7/2008 | Deen et al. | 700/276 |
| 7,409,451 B1 * | 8/2008 | Meenan et al. | 709/227 |
| 7,412,447 B2 * | 8/2008 | Hilbert et al. | 1/1 |
| 7,428,585 B1 * | 9/2008 | Owens et al. | 709/223 |
| 7,430,614 B2 | 9/2008 | Shen et al. | |
| 7,440,434 B2 | 10/2008 | Chaskar et al. | |
| 7,457,869 B2 | 11/2008 | Kernan | |
| 7,469,139 B2 | 12/2008 | van de Groenendaal | |
| 7,469,294 B1 | 12/2008 | Luo et al. | |
| 7,480,713 B2 * | 1/2009 | Ullman | 709/224 |
| 7,480,724 B2 * | 1/2009 | Zimler et al. | 709/229 |
| 7,506,052 B2 | 3/2009 | Qian et al. | |
| 7,509,687 B2 * | 3/2009 | Ofek et al. | 726/30 |
| 7,526,762 B1 | 4/2009 | Astala et al. | |
| 7,551,071 B2 | 6/2009 | Bennett, III et al. | |
| 7,558,379 B2 | 7/2009 | Winick | |
| 7,577,420 B2 | 8/2009 | Srinivasan et al. | |
| 7,587,464 B2 | 9/2009 | Moorer et al. | |
| 7,627,665 B2 | 12/2009 | Barker et al. | |
| 7,634,519 B2 | 12/2009 | Creamer et al. | |
| 7,681,201 B2 * | 3/2010 | Dale et al. | 719/313 |
| 7,827,252 B2 * | 11/2010 | Hopmann et al. | 709/217 |
| 7,884,855 B2 * | 2/2011 | Ortiz | 348/211.8 |
| 7,970,863 B1 * | 6/2011 | Fontaine | 709/218 |
| 2001/0016501 A1 | 8/2001 | King | |
| 2001/0030597 A1 * | 10/2001 | Inoue et al. | 340/3.7 |
| 2001/0034754 A1 | 10/2001 | Elwahab et al. | |
| 2002/0004828 A1 | 1/2002 | Davis et al. | |
| 2002/0026476 A1 | 2/2002 | Miyazaki et al. | |
| 2002/0029276 A1 | 3/2002 | Bendinelli et al. | |
| 2002/0038380 A1 | 3/2002 | Brawn et al. | |
| 2002/0052913 A1 | 5/2002 | Yamada et al. | |
| 2002/0083342 A1 | 6/2002 | Webb et al. | |
| 2002/0095490 A1 | 7/2002 | Barker et al. | |
| 2002/0103898 A1 | 8/2002 | Moyer et al. | |
| 2002/0103927 A1 | 8/2002 | Parent | |
| 2002/0107910 A1 | 8/2002 | Zhao | |
| 2002/0111698 A1 | 8/2002 | Graziano et al. | |
| 2002/0112051 A1 * | 8/2002 | Ullman | 709/224 |
| 2002/0112182 A1 * | 8/2002 | Chang et al. | 713/201 |
| 2002/0114439 A1 * | 8/2002 | Dunlap | 379/219 |
| 2002/0133539 A1 * | 9/2002 | Monday | 709/203 |
| 2002/0143923 A1 | 10/2002 | Alexander | |
| 2002/0156564 A1 | 10/2002 | Preston et al. | |
| 2002/0180579 A1 * | 12/2002 | Nagaoka et al. | 340/3.1 |
| 2002/0184301 A1 | 12/2002 | Parent | |
| 2003/0009552 A1 * | 1/2003 | Benfield et al. | 709/224 |
| 2003/0009553 A1 * | 1/2003 | Benfield et al. | 709/224 |
| 2003/0023839 A1 * | 1/2003 | Burkhardt et al. | 713/1 |
| 2003/0038849 A1 * | 2/2003 | Craven et al. | 345/864 |
| 2003/0041167 A1 * | 2/2003 | French et al. | 709/238 |
| 2003/0051009 A1 | 3/2003 | Shah et al. | |
| 2003/0052923 A1 | 3/2003 | Porter | |
| 2003/0062997 A1 * | 4/2003 | Naidoo et al. | 340/531 |
| 2003/0090473 A1 | 5/2003 | Joshi | |
| 2003/0115345 A1 | 6/2003 | Chien et al. | |
| 2003/0132018 A1 | 7/2003 | Okita et al. | |
| 2003/0147534 A1 * | 8/2003 | Ablay et al. | 380/270 |
| 2003/0174648 A1 | 9/2003 | Wang | |
| 2003/0187920 A1 | 10/2003 | Redkar | |
| 2003/0189509 A1 * | 10/2003 | Hayes et al. | 341/176 |
| 2003/0210126 A1 | 11/2003 | Kanazawa | |
| 2003/0236841 A1 | 12/2003 | Epshteyn | |
| 2004/0003241 A1 | 1/2004 | Sengodan et al. | |
| 2004/0015572 A1 | 1/2004 | Kang | |
| 2004/0037295 A1 | 2/2004 | Tanaka et al. | |
| 2004/0054789 A1 | 3/2004 | Breh et al. | |
| 2004/0086088 A1 | 5/2004 | Naidoo et al. | |
| 2004/0123149 A1 | 6/2004 | Tyroler | |
| 2004/0139227 A1 | 7/2004 | Takeda | |
| 2004/0162902 A1 * | 8/2004 | Davis | 709/227 |
| 2004/0177163 A1 * | 9/2004 | Casey et al. | 709/249 |
| 2004/0189871 A1 * | 9/2004 | Kurosawa et al. | 348/552 |
| 2004/0199645 A1 * | 10/2004 | Rouhi | 709/227 |
| 2004/0243835 A1 | 12/2004 | Terzis et al. | |
| 2004/0267937 A1 | 12/2004 | Klements | |
| 2005/0038326 A1 | 2/2005 | Mathur | |
| 2005/0066045 A1 | 3/2005 | Johnson et al. | |
| 2005/0069098 A1 | 3/2005 | Kalervo et al. | |
| 2005/0079855 A1 | 4/2005 | Jethi et al. | |
| 2005/0086126 A1 | 4/2005 | Patterson | |
| 2005/0108091 A1 | 5/2005 | Sotak et al. | |
| 2005/0108369 A1 | 5/2005 | Sather et al. | |
| 2005/0120082 A1 * | 6/2005 | Hesselink et al. | 709/203 |
| 2005/0125083 A1 | 6/2005 | Kiko | |
| 2005/0128083 A1 | 6/2005 | Puzio et al. | |
| 2005/0149639 A1 | 7/2005 | Vrielink et al. | |
| 2005/0169288 A1 | 8/2005 | Kamiwada et al. | |
| 2005/0197847 A1 | 9/2005 | Smith | |
| 2005/0216302 A1 | 9/2005 | Raji et al. | |
| 2005/0216580 A1 | 9/2005 | Raji et al. | |
| 2005/0222820 A1 | 10/2005 | Chung | |
| 2005/0231347 A1 | 10/2005 | Bhat | |
| 2005/0267605 A1 * | 12/2005 | Lee et al. | 700/19 |
| 2006/0009863 A1 | 1/2006 | Lingemann | |
| 2006/0088092 A1 | 4/2006 | Chen et al. | |
| 2006/0105713 A1 | 5/2006 | Zheng et al. | |
| 2006/0111095 A1 | 5/2006 | Weigand | |
| 2006/0142968 A1 * | 6/2006 | Han et al. | 702/120 |
| 2006/0181406 A1 | 8/2006 | Petite et al. | |
| 2006/0182100 A1 | 8/2006 | Li et al. | |
| 2006/0187900 A1 | 8/2006 | Akbar | |
| 2006/0200845 A1 | 9/2006 | Foster et al. | |
| 2006/0206220 A1 | 9/2006 | Amundson | |
| 2006/0242395 A1 * | 10/2006 | Fausak | 713/1 |
| 2006/0271695 A1 * | 11/2006 | Lavian | 709/229 |
| 2006/0282886 A1 * | 12/2006 | Gaug | 726/5 |
| 2007/0052675 A1 | 3/2007 | Chang | |
| 2007/0061266 A1 * | 3/2007 | Moore et al. | 705/51 |
| 2007/0079385 A1 * | 4/2007 | Williams et al. | 726/27 |
| 2007/0106124 A1 | 5/2007 | Kuriyama et al. | |
| 2007/0130286 A1 * | 6/2007 | Hopmann et al. | 709/217 |
| 2007/0142022 A1 | 6/2007 | Madonna et al. | |
| 2007/0143440 A1 * | 6/2007 | Reckamp et al. | 709/217 |
| 2007/0146484 A1 * | 6/2007 | Horton et al. | 348/159 |
| 2007/0192486 A1 * | 8/2007 | Wilson et al. | 709/225 |
| 2007/0216783 A1 * | 9/2007 | Ortiz et al. | 348/235 |
| 2007/0256105 A1 * | 11/2007 | Tabe | 725/78 |
| 2007/0286210 A1 | 12/2007 | Gutt et al. | |
| 2007/0286369 A1 | 12/2007 | Gutt et al. | |
| 2007/0298772 A1 | 12/2007 | Owen et al. | |
| 2008/0042826 A1 | 2/2008 | Hevia et al. | |
| 2008/0065681 A1 | 3/2008 | Fontijn et al. | |
| 2008/0084296 A1 | 4/2008 | Kutzik et al. | |
| 2008/0147834 A1 | 6/2008 | Quinn et al. | |
| 2008/0163355 A1 * | 7/2008 | Chu | 726/12 |
| 2008/0180240 A1 | 7/2008 | Raji et al. | |
| 2008/0183842 A1 | 7/2008 | Raji et al. | |
| 2008/0235326 A1 | 9/2008 | Parsi et al. | |
| 2009/0070436 A1 | 3/2009 | Dawes et al. | |
| 2009/0077622 A1 * | 3/2009 | Baum et al. | 726/1 |
| 2009/0165114 A1 | 6/2009 | Baum et al. | |
| 2009/0204693 A1 | 8/2009 | Andreev et al. | |
| 2009/0240787 A1 | 9/2009 | Denny | |
| 2009/0240814 A1 | 9/2009 | Brubacher et al. | |
| 2010/0082744 A1 | 4/2010 | Gutt | |
| 2010/0095111 A1 | 4/2010 | Gutt | |
| 2010/0095369 A1 | 4/2010 | Gutt | |
| 2011/0283006 A1 * | 11/2011 | Ramamurthy | 709/228 |

FOREIGN PATENT DOCUMENTS

| | | |
|---|---|---|
| WO | WO 01/99078 | 12/2001 |
| WO | WO 2004/004222 | 1/2004 |

OTHER PUBLICATIONS

Form PCT/ISA/210, "PCT International Search Report," 2 pgs.

Form PCT/ISA/237, "PCT Written Opinion of the International Searching Authority," 6 pgs.

Form PCT/ISA/237, "PCT Written Opinion of the International Searching Authority," 7 pgs.
Examination Report under Section 18(3) re UK patent application No. GB0724760.4 dated Jan. 30, 2008 4 pgs.
Examination Report under Section 18(3) re UK patent application No. GB0724248.0 dated Jan. 30, 2008 4 pgs.
Examination Report under Section 18(3) re UK patent application No. GB0724248.0 dated Jun. 4, 2008 2 pgs.
Examination Report under Section 18(3) re UK patent application No. GB0800040.8 dated Jan. 30, 2008 4 pgs.
Examination Report under Section 18(3) re UK patent application No. GB0620362.4 dated Aug. 13, 2007, 3 pgs.

Alarm.com—Interactive Security Systems, Product Advantages, printed from website Nov. 4, 2003, 3 pp.
Alarm.com—Interactive Security Systems, Frequently Asked Questions, printed from website Nov. 4, 2003, 3 pp.
Alarm.com—Interactive Security Systems, Elders, printed from website Nov. 4, 2003, 1 page.
Alarm.com—Interactive Security Systems, Overview, printed from website Nov. 4, 2003, 2 pp.
X10—ActiveHome, Home Automation Made Easy!, printed from website Nov. 4, 2003, 3 pp.

\* cited by examiner

FORMING A SECURITY NETWORK INCLUDING INTEGRATED SECURITY SYSTEM COMPONENTS AND NETWORK DEVICES

RELATED APPLICATIONS

This application is a divisional application of U.S. patent application Ser. No. 12/189,757, filed Aug. 11, 2008.

This application claims the benefit of U.S. Patent Application No. 60/968,005, filed Aug. 24, 2007.

This application claims the benefit of U.S. Patent Application No. 60/987,359, filed Nov. 12, 2007.

This application claims the benefit of U.S. Patent Application No. 60/987,366, filed Nov. 12, 2007.

This application claims the benefit of U.S. Patent Application No. 61/019,162, filed Jan. 4, 2008.

This application claims the benefit of U.S. Patent Application No. 61/019,167, filed Jan. 4, 2008.

This application claims the benefit of U.S. Patent Application No. 61/023,489, filed Jan. 25, 2008.

This application claims the benefit of U.S. Patent Application No. 61/023,493, filed Jan. 25, 2008.

This application claims the benefit of U.S. Patent Application No. 61/023,496, filed Jan. 25, 2008.

This application claims the benefit of U.S. Patent Application No. 61/087,967, filed Aug. 11, 2008.

This application is a continuation in part application of U.S. patent application Ser. No. 11/084,232, filed Mar. 16, 2005 now U.S. Pat. No. 8,335,842.

This application is a continuation in part application of U.S. patent application Ser. No. 11/761,718, filed Jun. 12, 2007 now U.S. Pat. No. 7,711,796.

This application is a continuation in part application of U.S. patent application Ser. No. 11/761,745, filed Jun. 12, 2007.

This application is a continuation in part application of U.S. patent application Ser. No. 12/019,554, filed Jan. 24, 2008 now U.S. Pat. No. 7,911,341.

This application is a continuation in part application of U.S. patent application Ser. No. 12/019,568, filed Jan. 24, 2008.

TECHNICAL FIELD

The embodiments described herein relate generally to a method and apparatus for improving the capabilities of security systems in home and business applications. More particularly, the embodiments described herein relate to a method and apparatus for wirelessly interfacing to and controlling security systems from within a home or business, and extending such control and interface to remote devices outside the premise.

BACKGROUND

The field of home and small business security is dominated by technology suppliers who build comprehensive 'closed' security systems, where the individual components (sensors, security panels, keypads) operate solely within the confines of a single vendor solution. For example, a wireless motion sensor from vendor A cannot be used with a security panel from vendor B. Each vendor typically has developed sophisticated proprietary wireless technologies to enable the installation and management of wireless sensors, with little or no ability for the wireless devices to operate separate from the vendor's homogeneous system. Furthermore, these traditional systems are extremely limited in their ability to interface either to a local or wide area standards-based network (such as an IP network); most installed systems support only a low-bandwidth, intermittent connection utilizing phone lines or cellular (RF) backup systems. Wireless security technology from providers such as GE Security, Honeywell, and DSC/Tyco are well known in the art, and are examples of this proprietary approach to security systems for home and business.

Furthermore, with the proliferation of the internet, ethernet and WiFi local area networks (LANs) and advanced wide area networks (WANs) that offer high bandwidth, low latency connections (broadband), as well as more advanced wireless WAN data networks (e.g. GPRS or CDMA 1xRTT) there increasingly exists the networking capability to extend these traditional security systems to offer enhanced functionality. In addition, the proliferation of broadband access has driven a corresponding increase in home and small business networking technologies and devices. It is desirable to extend traditional security systems to encompass enhanced functionality such as the ability to control and manage security systems from the world wide web, cellular telephones, or advanced function internet-based devices. Other desired functionality includes an open systems approach to interface home security systems to home and small business networks.

Due to the proprietary approach described above, the traditional vendors are the only ones capable of taking advantage of these new network functions. To date, even though the vast majority of home and business customers have broadband network access in their premises, most security systems do not offer the advanced capabilities associated with high speed, low-latency LANs and WANs. This is primarily because the proprietary vendors have not been able to deliver such technology efficiently or effectively. Solution providers attempting to address this need are becoming known in the art, including three categories of vendors: traditional proprietary hardware providers such as Honeywell and GE Security; third party hard-wired module providers such as Alarm.com, NextAlarm, and uControl; and new proprietary systems providers such as InGrid.

A disadvantage of the prior art technologies of the traditional proprietary hardware providers arises due to the continued proprietary approach of these vendors. As they develop technology in this area it once again operates only with the hardware from that specific vendor, ignoring the need for a heterogeneous, cross-vendor solution. Yet another disadvantage of the prior art technologies of the traditional proprietary hardware providers arises due to the lack of experience and capability of these companies in creating open internet and web based solutions, and consumer friendly interfaces.

A disadvantage of the prior art technologies of the third party hard-wired module providers arises due to the installation and operational complexities and functional limitations associated with hardwiring a new component into existing security systems. Moreover, a disadvantage of the prior art technologies of the new proprietary systems providers arises due to the need to discard all prior technologies, and implement an entirely new form of security system to access the new functionalities associated with broadband and wireless data networks. There remains, therefore, a need for systems, devices, and methods that easily interface to and control the existing proprietary security technologies utilizing a variety of wireless technologies.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Figure 1:
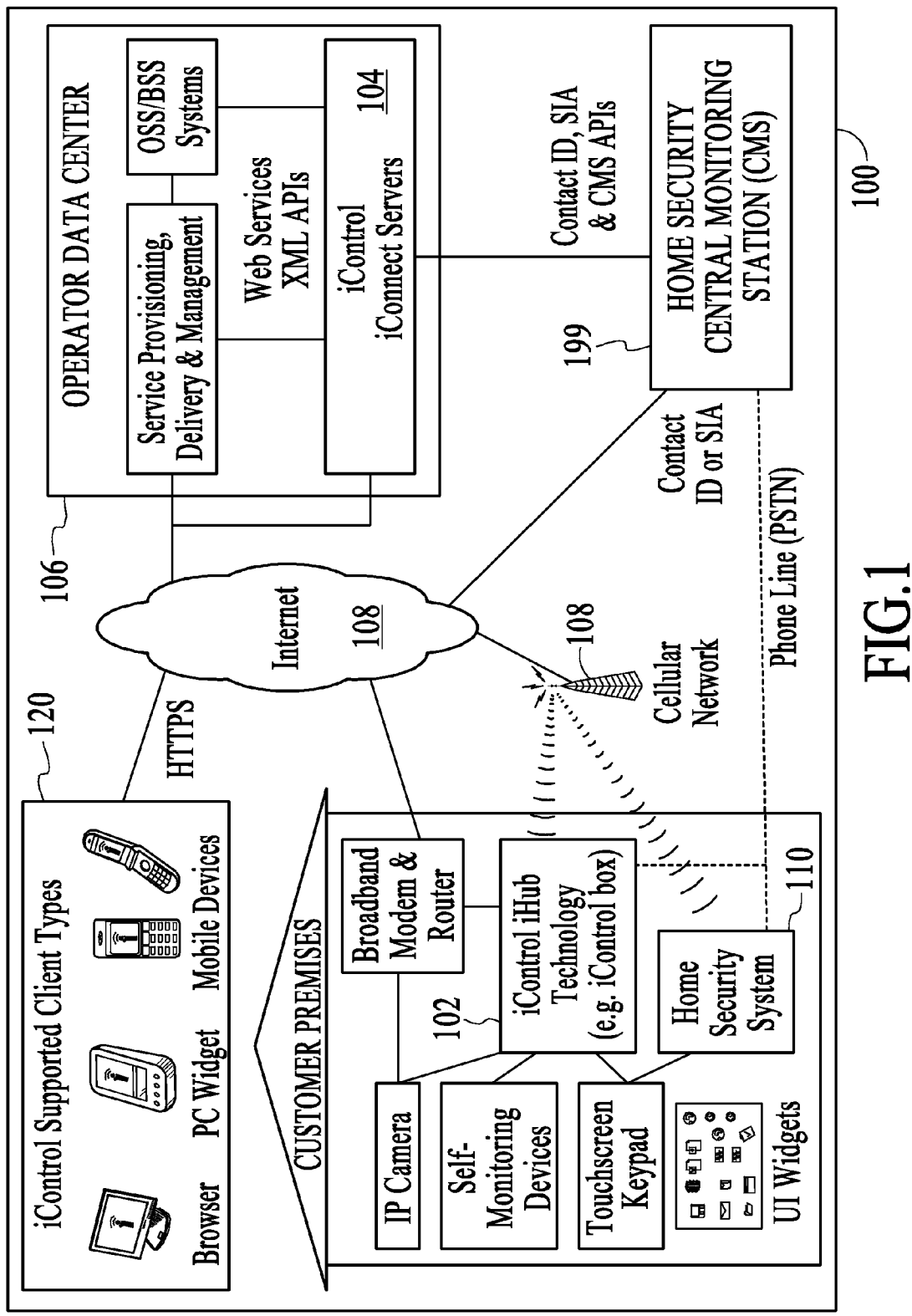
FIG. 1 is a block diagram of the integrated security system, under an embodiment.

An integrated security system is described that integrates broadband and mobile access and control with conventional security systems and premise devices to provide a tri-mode security network (broadband, cellular/GSM, POTS access) that enables users to remotely stay connected to their premises. The integrated security system, while delivering remote premise monitoring and control functionality to conventional monitored premise protection, complements existing premise protection equipment. The integrated security system integrates into the premise network and couples wirelessly with the conventional security panel, enabling broadband access to premise security systems. Automation devices (cameras, lamp modules, thermostats, etc.) can be added, enabling users to remotely see live video and/or pictures and control home devices via their personal web portal or webpage, mobile phone, and/or other remote client device. Users can also receive notifications via email or text message when happenings occur, or do not occur, in their home.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

In accordance with the embodiments described herein, a wireless system (e.g., radio frequency (RF)) is provided that enables a security provider or consumer to extend the capabilities of an existing RF-capable security system or a non-RF-capable security system that has been upgraded to support RF capabilities. The system includes an RF-capable Gateway device (physically located within RF range of the RF-capable security system) and associated software operating on the Gateway device. The system also includes a web server, application server, and remote database providing a persistent store for information related to the system.

The security systems of an embodiment, referred to herein as the iControl security system or integrated security system, extend the value of traditional home security by adding broadband access and the advantages of remote home monitoring and home control through the formation of a security network including components of the integrated security system integrated with a conventional premise security system and a premise local area network (LAN). With the integrated security system, conventional home security sensors, cameras, touchscreen keypads, lighting controls, and/or Internet Protocol (IP) devices in the home (or business) become connected devices that are accessible anywhere in the world from a web browser, mobile phone or through content-enabled touchscreens. The integrated security system experience allows security operators to both extend the value proposition of their monitored security systems and reach new consumers that include broadband users interested in staying connected to their family, home and property when they are away from home.

The integrated security system of an embodiment includes security servers (also referred to herein as iConnect servers or security network servers) and an iHub gateway (also referred to herein as the gateway, the iHub, or the iHub client) that couples or integrates into a home network (e.g., LAN) and communicates directly with the home security panel, in both wired and wireless installations. The security system of an embodiment automatically discovers the security system components (e.g., sensors, etc.) belonging to the security system and connected to a control panel of the security system and provides consumers with full two-way access via web and mobile portals. The gateway supports various wireless protocols and can interconnect with a wide range of control panels offered by security system providers. Service providers and users can then extend the system's capabilities with the additional IP cameras, lighting modules or security devices such as interactive touchscreen keypads. The integrated security system adds an enhanced value to these security systems by enabling consumers to stay connected through email and SMS alerts, photo push, event-based video capture and rule-based monitoring and notifications. This solution extends the reach of home security to households with broadband access.

The integrated security system builds upon the foundation afforded by traditional security systems by layering broadband and mobile access, IP cameras, interactive touchscreens, and an open approach to home automation on top of traditional security system configurations. The integrated security system is easily installed and managed by the security operator, and simplifies the traditional security installation process, as described below.

The integrated security system provides an open systems solution to the home security market. As such, the foundation of the integrated security system customer premises equipment (CPE) approach has been to abstract devices, and allows applications to manipulate and manage multiple devices from any vendor. The integrated security system DeviceConnect technology that enables this capability supports protocols, devices, and panels from GE Security and Honeywell, as well as consumer devices using Z-Wave, IP cameras (e.g., Ethernet, wifi, and Homeplug), and IP touchscreens. The DeviceConnect is a device abstraction layer that enables any device or protocol layer to interoperate with integrated security system components. This architecture enables the addition of new devices supporting any of these interfaces, as well as add entirely new protocols.

The benefit of DeviceConnect is that it provides supplier flexibility. The same consistent touchscreen, web, and mobile user experience operate unchanged on whatever security equipment selected by a security system provider, with the system provider's choice of IP cameras, backend data center and central station software.

The integrated security system provides a complete system that integrates or layers on top of a conventional host security system available from a security system provider. The security system provider therefore can select different components or configurations to offer (e.g., CDMA, GPRS, no cellular, etc.) as well as have iControl modify the integrated security system configuration for the system provider's specific needs (e.g., change the functionality of the web or mobile portal, add a GE or Honeywell-compatible TouchScreen, etc.).

The integrated security system integrates with the security system provider infrastructure for central station reporting directly via Broadband and GPRS alarm transmissions. Traditional dial-up reporting is supported via the standard panel connectivity. Additionally, the integrated security system provides interfaces for advanced functionality to the CMS, including enhanced alarm events, system installation optimizations, system test verification, video verification, 2-way voice over IP and GSM.

The integrated security system is an IP centric system that includes broadband connectivity so that the gateway augments the existing security system with broadband and GPRS connectivity. If broadband is down or unavailable GPRS may be used, for example. The integrated security system supports GPRS connectivity using an optional wireless package that includes a GPRS modem in the gateway. The integrated security system treats the GPRS connection as a higher cost though flexible option for data transfers. In an embodiment the GPRS connection is only used to route alarm events (e.g., for cost), however the gateway can be configured (e.g., through the iConnect server interface) to act as a primary channel and pass any or all events over GPRS. Consequently, the integrated security system does not interfere with the current plain old telephone service (POTS) security panel interface. Alarm events can still be routed through POTS; however the gateway also allows such events to be routed through a broadband or GPRS connection as well. The integrated security system provides a web application interface to the CSR tool suite as well as XML web services interfaces for programmatic integration between the security system provider's existing call center products. The integrated security system includes, for example, APIs that allow the security system provider to integrate components of the integrated security system into a custom call center interface. The APIs include XML web service APIs for integration of existing security system provider call center applications with the integrated security system service. All functionality available in the CSR Web application is provided with these API sets. The Java and XML-based APIs of the integrated security system support provisioning, billing, system administration, CSR, central station, portal user interfaces, and content management functions, to name a few. The integrated security system can provide a customized interface to the security system provider's billing system, or alternatively can provide security system developers with APIs and support in the integration effort.

The integrated security system provides or includes business component interfaces for provisioning, administration, and customer care to name a few. Standard templates and examples are provided with a defined customer professional services engagement to help integrate OSS/BSS systems of a Service Provider with the integrated security system.

The integrated security system components support and allow for the integration of customer account creation and deletion with a security system. The iConnect APIs provides access to the provisioning and account management system in iConnect and provide full support for account creation, provisioning, and deletion. Depending on the requirements of the security system provider, the iConnect APIs can be used to completely customize any aspect of the integrated security system backend operational system.

The integrated security system includes a gateway that supports the following standards-based interfaces, to name a few: Ethernet IP communications via Ethernet ports on the gateway, and standard XML/TCP/IP protocols and ports are employed over secured SSL sessions; USB 2.0 via ports on the gateway; 802.11b/g/n IP communications; GSM/GPRS RF WAN communications; CDMA 1xRTT RF WAN communications (optional, can also support EVDO and 3G technologies).

The gateway supports the following proprietary interfaces, to name a few: interfaces including Dialog RF network (319.5 MHz) and RS485 Superbus 2000 wired interface; RF mesh network (908 MHz); and interfaces including RF network (345 MHz) and RS485/RS232 bus wired interfaces.

Regarding security for the IP communications (e.g., authentication, authorization, encryption, anti-spoofing, etc), the integrated security system uses SSL to encrypt all IP traffic, using server and client-certificates for authentication, as well as authentication in the data sent over the SSL-encrypted channel. For encryption, integrated security system issues public/private key pairs at the time/place of manufacture, and certificates are not stored in any online storage in an embodiment.

The integrated security system does not need any special rules at the customer premise and/or at the security system provider central station because the integrated security system makes outgoing connections using TCP over the standard HTTP and HTTPS ports. Provided outbound TCP connections are allowed then no special requirements on the firewalls are necessary.

FIG. 1 is a block diagram of the integrated security system 100, under an embodiment. The integrated security system 100 of an embodiment includes the gateway 102 and the security servers 104 coupled to the conventional home security system 110. At a customer's home or business, the gateway 102 connects and manages the diverse variety of home security and self-monitoring devices. The gateway 102 communicates with the iConnect Servers 104 located in the service provider's data center 106 (or hosted in integrated security system data center), with the communication taking place via a communication network 108 or other network (e.g., cellular network, internet, etc.). These servers 104 manage the system integrations necessary to deliver the integrated system service described herein. The combination of the gateway 102 and the iConnect servers 104 enable a wide variety of remote client devices 120 (e.g., PCs, mobile phones and PDAs) allowing users to remotely stay in touch with their home, business and family. In addition, the technology allows home security and self-monitoring information, as well as relevant third party content such as traffic and weather, to be presented in intuitive ways within the home, such as on advanced touchscreen keypads.

The integrated security system service (also referred to as iControl service) can be managed by a service provider via browser-based Maintenance and Service Management applications that are provided with the iConnect Servers. Or, if desired, the service can be more tightly integrated with existing OSS/BSS and service delivery systems via the iConnect web services-based XML APIs.

The integrated security system service can also coordinate the sending of alarms to the home security Central Monitoring Station (CMS) 199. Alarms are passed to the CMS 199 using standard protocols such as Contact ID or SIA and can be generated from the home security panel location as well as by iConnect server 104 conditions (such as lack of communications with the integrated security system). In addition, the link between the security servers 104 and CMS 199 provides tighter integration between home security and self-monitoring devices and the gateway 102. Such integration enables advanced security capabilities such as the ability for CMS personnel to view photos taken at the time a burglary alarm was triggered. For maximum security, the gateway 102 and iConnect servers 104 support the use of a mobile network (both GPRS and CDMA options are available) as a backup to the primary broadband connection.

Figure 2:
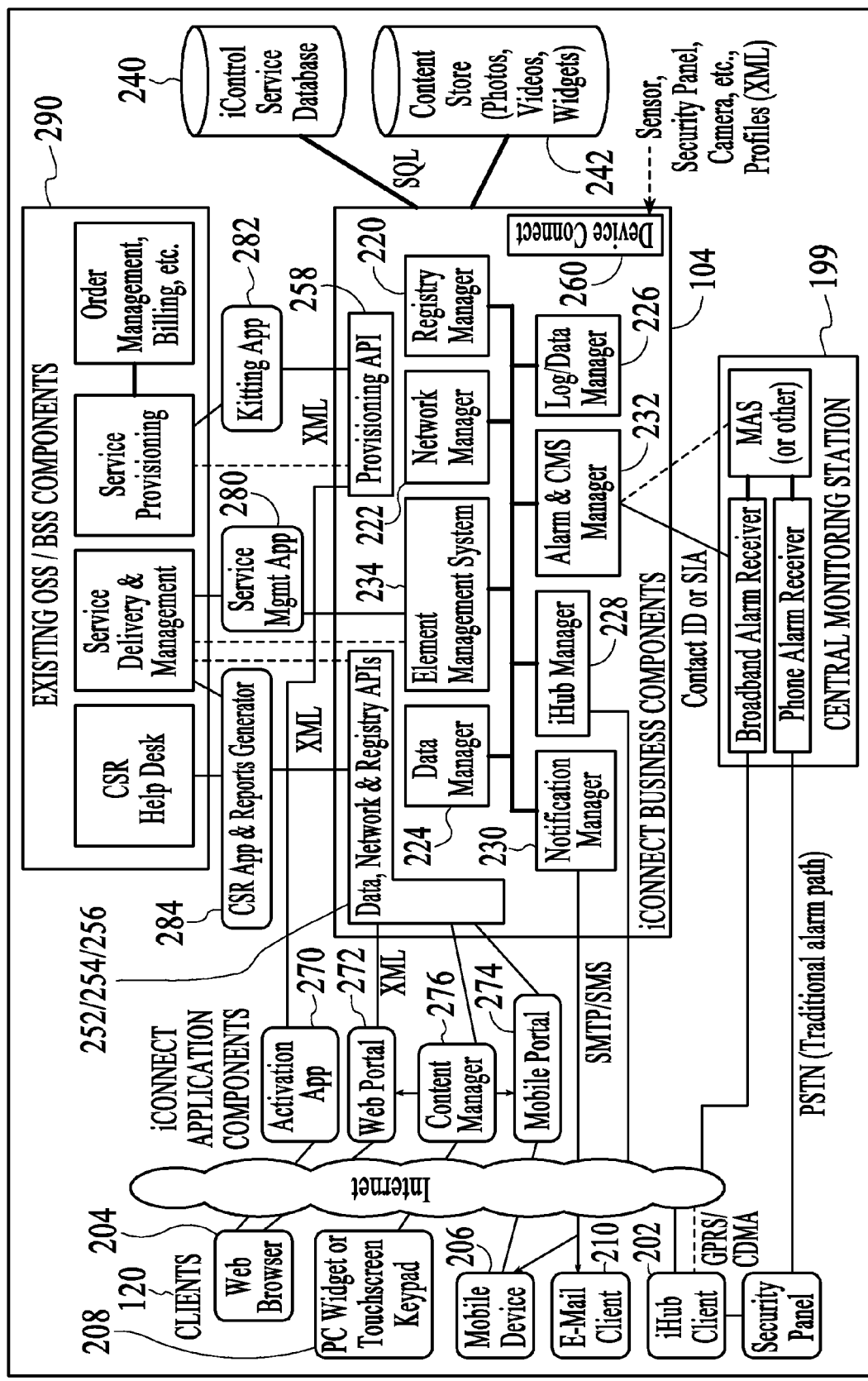
FIG. 2 is a block diagram of components of the integrated security system, under an embodiment.

The integrated security system service is delivered by hosted servers running software components that communicate with a variety of client types while interacting with other systems. FIG. 2 is a block diagram of components of the integrated security system 100, under an embodiment. Following is a more detailed description of the components.

The iConnect servers 104 support a diverse collection of clients 120 ranging from mobile devices, to PCs, to in-home security devices, to a service provider's internal systems. Most clients 120 are used by end-users, but there are also a number of clients 120 that are used to operate the service.

Clients 120 used by end-users of the integrated security system 100 include, but are not limited to, the following:
- Clients based on gateway client applications 202 (e.g., a processor-based device running the gateway technology that manages home security and automation devices).
- A web browser 204 accessing a Web Portal application, performing end-user configuration and customization of the integrated security system service as well as monitoring of in-home device status, viewing photos and video, etc. Device and user management can also be performed by this portal application.
- A mobile device 206 (e.g., PDA, mobile phone, etc.) accessing the integrated security system Mobile Portal. This type of client 206 is used by end-users to view system status and perform operations on devices (e.g., turning on a lamp, arming a security panel, etc.) rather than for system configuration tasks such as adding a new device or user.
- PC or browser-based "widget" containers 208 that present integrated security system service content, as well as other third-party content, in simple, targeted ways (e.g. a widget that resides on a PC desktop and shows live video from a single in-home camera).
- Touchscreen home security keypads 208 and advanced in-home devices that present a variety of content widgets via an intuitive touchscreen user interface.
- Notification recipients 210 (e.g., cell phones that receive SMS-based notifications when certain events occur (or don't occur), email clients that receive an email message with similar information, etc.).
- Custom-built clients (not shown) that access the iConnect web services XML API to interact with users' home security and self-monitoring information in new and unique ways. Such clients could include new types of mobile devices, or complex applications where integrated security system content is integrated into a broader set of application features.

In addition to the end-user clients, the iConnect servers 104 support PC browser-based Service Management clients that manage the ongoing operation of the overall service. These clients run applications that handle tasks such as provisioning, service monitoring, customer support and reporting.

There are numerous types of server components of the iConnect servers 104 of an embodiment including, but not limited to, the following: Business Components which manage information about all of the home security and self-monitoring devices; End-User Application Components which display that information for users and access the Business Components via published XML APIs; and Service Management Application Components which enable operators to administer the service (these components also access the Business Components via the XML APIs, and also via published SNMP MIBs).

The server components provide access to, and management of, the objects associated with an integrated security system installation. The top-level object is the "network." It is a location where a gateway 102 is located, and is also commonly referred to as a site or premises; the premises can include any type of structure (e.g., home, office, warehouse, etc.) at which a gateway 102 is located. Users can only access the networks to which they have been granted permission. Within a network, every object monitored by the gateway 102 is called a device. Devices include the sensors, cameras, home security panels and automation devices, as well as the controller or processor-based device running the gateway applications.

Various types of interactions are possible between the objects in a system. Automations define actions that occur as a result of a change in state of a device. For example, take a picture with the front entry camera when the front door sensor changes to "open". Notifications are messages sent to users to indicate that something has occurred, such as the front door going to "open" state, or has not occurred (referred to as an iWatch notification). Schedules define changes in device states that are to take place at predefined days and times. For example, set the security panel to "Armed" mode every weeknight at 11:00 pm.

The iConnect Business Components are responsible for orchestrating all of the low-level service management activities for the integrated security system service. They define all of the users and devices associated with a network (site), analyze how the devices interact, and trigger associated actions (such as sending notifications to users). All changes in device states are monitored and logged. The Business Components also manage all interactions with external systems as required, including sending alarms and other related self-monitoring data to the home security Central Monitoring System (CMS) 199. The Business Components are implemented as portable Java J2EE Servlets, but are not so limited.

The following iConnect Business Components manage the main elements of the integrated security system service, but the embodiment is not so limited:

A Registry Manager 220 defines and manages users and networks. This component is responsible for the creation, modification and termination of users and networks. It is also where a user's access to networks is defined.

A Network Manager 222 defines and manages security and self-monitoring devices that are deployed on a network (site). This component handles the creation, modification, deletion and configuration of the devices, as well as the creation of automations, schedules and notification rules associated with those devices.

A Data Manager 224 manages access to current and logged state data for an existing network and its devices. This component specifically does not provide any access to network management capabilities, such as adding new devices to a network, which are handled exclusively by the Network Manager 222.

To achieve optimal performance for all types of queries, data for current device states is stored separately from historical state data (a.k.a. "logs") in the database. A Log Data Manager 226 performs ongoing transfers of current device state data to the historical data log tables.

Additional iConnect Business Components handle direct communications with certain clients and other systems, for example:

An iHub Manager 228 directly manages all communications with iHub clients, including receiving information about device state changes, changing the configuration of devices, and pushing new versions of the iHub client to the hardware it is running on.

A Notification Manager 230 is responsible for sending all notifications to clients via SMS (mobile phone messages), email (via a relay server like an SMTP email server), etc.

An Alarm and CMS Manager 232 sends critical server-generated alarm events to the home security Central Monitoring Station (CMS) and manages all other communications of integrated security system service data to and from the CMS.

The Element Management System (EMS) 234 is an iControl Business Component that manages all activities associated with service installation, scaling and monitoring, and filters and packages service operations data for use by service management applications. The SNMP MIBs published by the EMS can also be incorporated into any third party monitoring system if desired.

The iConnect Business Components store information about the objects that they manage in the iControl Service Database 240 and in the iControl Content Store 242. The iControl Content Store is used to store media objects like video, photos and widget content, while the Service Database stores information about users, networks, and devices. Database interaction is performed via a JDBC interface. For security purposes, the Business Components manage all data storage and retrieval.

The iControl Business Components provide web services-based APIs that application components use to access the Business Components' capabilities. Functions of application components include presenting integrated security system service data to end-users, performing administrative duties, and integrating with external systems and back-office applications.

The primary published APIs for the iConnect Business Components include, but are not limited to, the following:

A Registry Manager API 252 provides access to the Registry Manager Business Component's functionality, allowing management of networks and users.

A Network Manager API 254 provides access to the Network Manager Business Component's functionality, allowing management of devices on a network.

A Data Manager API 256 provides access to the Data Manager Business Component's functionality, such as setting and retrieving (current and historical) data about device states.

A Provisioning API 258 provides a simple way to create new networks and configure initial default properties.

Each API of an embodiment includes two modes of access: Java API or XML API. The XML APIs are published as web services so that they can be easily accessed by applications or servers over a network. The Java APIs are a programmer-friendly wrapper for the XML APIs. Application components and integrations written in Java should generally use the Java APIs rather than the XML APIs directly.

The iConnect Business Components also have an XML-based interface 260 for quickly adding support for new devices to the integrated security system. This interface 260, referred to as DeviceConnect 260, is a flexible, standards-based mechanism for defining the properties of new devices and how they can be managed. Although the format is flexible enough to allow the addition of any type of future device, pre-defined XML profiles are currently available for adding common types of devices such as sensors (SensorConnect), home security panels (PanelConnect) and IP cameras (CameraConnect).

The iConnect End-User Application Components deliver the user interfaces that run on the different types of clients supported by the integrated security system service. The components are written in portable Java J2EE technology (e.g., as Java Servlets, as JavaServer Pages (JSPs), etc.) and they all interact with the iControl Business Components via the published APIs.

The following End-User Application Components generate CSS-based HTML/JavaScript that is displayed on the target client. These applications can be dynamically branded with partner-specific logos and URL links (such as Customer Support, etc.). The End-User Application Components of an embodiment include, but are not limited to, the following:

An iControl Activation Application 270 that delivers the first application that a user sees when they set up the integrated security system service. This wizard-based web browser application securely associates a new user with a purchased gateway and the other devices included with it as a kit (if any). It primarily uses functionality published by the Provisioning API.

An iControl Web Portal Application 272 runs on PC browsers and delivers the web-based interface to the integrated security system service. This application allows users to manage their networks (e.g. add devices and create automations) as well as to view/change device states, and manage pictures and videos. Because of the wide scope of capabilities of this application, it uses three different Business Component APIs that include the Registry Manager API, Network Manager API, and Data Manager API, but the embodiment is not so limited.

An iControl Mobile Portal 274 is a small-footprint web-based interface that runs on mobile phones and PDAs. This interface is optimized for remote viewing of device states and pictures/videos rather than network management. As such, its interaction with the Business Components is primarily via the Data Manager API.

Custom portals and targeted client applications can be provided that leverage the same Business Component APIs used by the above applications.

A Content Manager Application Component 276 delivers content to a variety of clients. It sends multimedia-rich user interface components to widget container clients (both PC and browser-based), as well as to advanced touchscreen keypad clients. In addition to providing content directly to end-user devices, the Content Manager 276 provides widget-based user interface components to satisfy requests from other Application Components such as the iControl Web 272 and Mobile 274 portals.

A number of Application Components are responsible for overall management of the service. These pre-defined applications, referred to as Service Management Application Components, are configured to offer off-the-shelf solutions for production management of the integrated security system service including provisioning, overall service monitoring, customer support, and reporting, for example. The Service Management Application Components of an embodiment include, but are not limited to, the following:

- A Service Management Application 280 allows service administrators to perform activities associated with service installation, scaling and monitoring/alerting. This application interacts heavily with the Element Management System (EMS) Business Component to execute its functionality, and also retrieves its monitoring data from that component via protocols such as SNMP MIBs.
- A Kitting Application 282 is used by employees performing service provisioning tasks. This application allows home security and self-monitoring devices to be associated with gateways during the warehouse kitting process.
- A CSR Application and Report Generator 284 is used by personnel supporting the integrated security system service, such as CSRs resolving end-user issues and employees enquiring about overall service usage. Pushes of new gateway firmware to deployed gateways is also managed by this application.

The iConnect servers 104 also support custom-built integrations with a service provider's existing OSS/BSS, CSR and service delivery systems 290. Such systems can access the iConnect web services XML API to transfer data to and from the iConnect servers 104. These types of integrations can compliment or replace the PC browser-based Service Management applications, depending on service provider needs.

As described above, the integrated security system of an embodiment includes an gateway, or iHub. The gateway of an embodiment includes a device that is deployed in the home or business and couples or connects the various third-party cameras, home security panels, sensors and devices to the iConnect server over a WAN connection as described in detail herein. The gateway couples to the home network and communicates directly with the home security panel in both wired and wireless sensor installations. The gateway is configured to be low-cost, reliable and thin so that it complements the integrated security system network-based architecture.

The gateway supports various wireless protocols and can interconnect with a wide range of home security control panels. Service providers and users can then extend the system's capabilities by adding IP cameras, lighting modules and additional security devices. The gateway is configurable to be integrated into many consumer appliances, including set-top boxes, routers and security panels. The small and efficient footprint of the gateway enables this portability and versatility, thereby simplifying and reducing the overall cost of the deployment.

Figure 3:
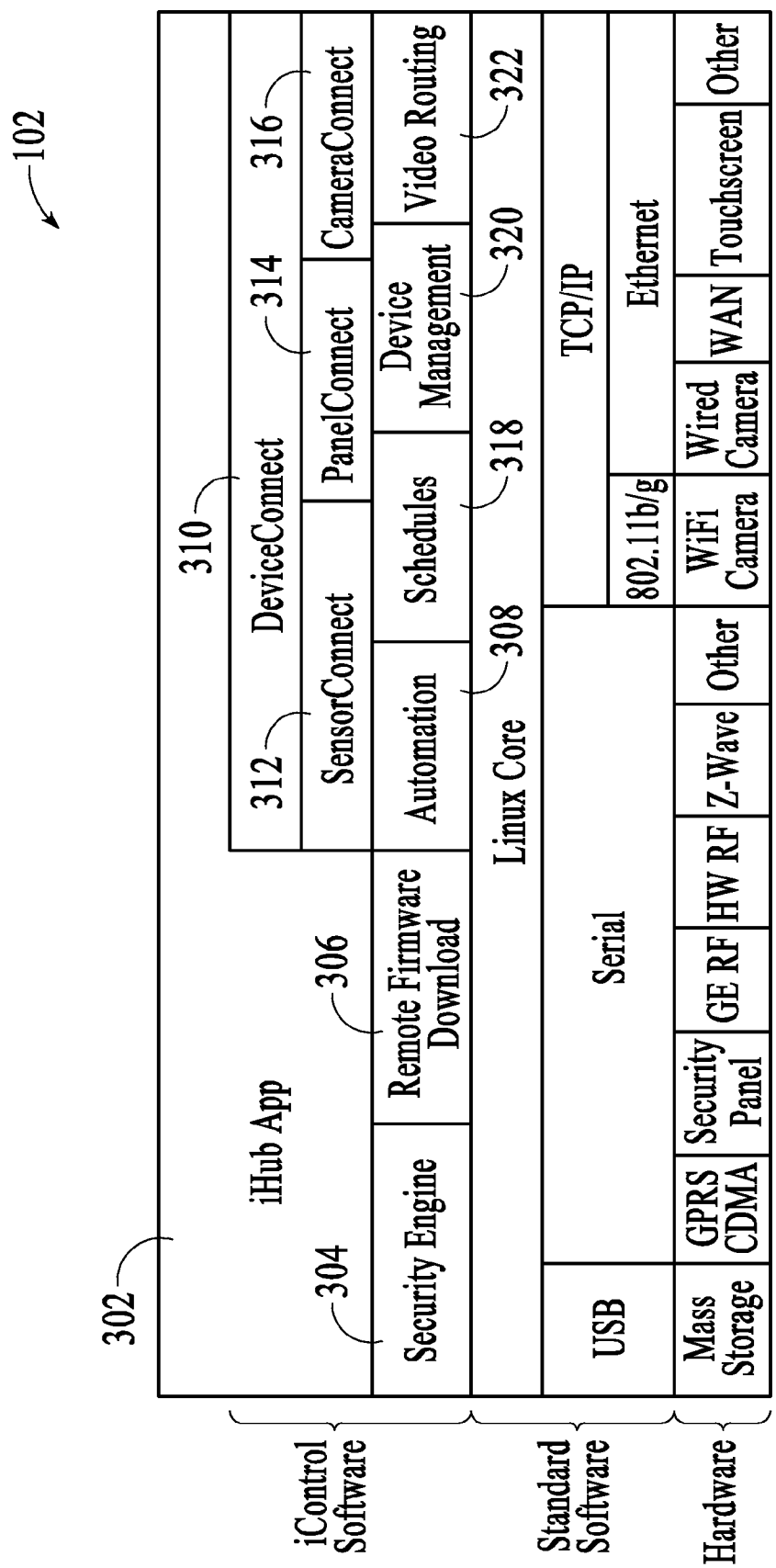
FIG. 3 is a block diagram of the gateway software or applications, under an embodiment.

FIG. 3 is a block diagram of the gateway 102 including gateway software or applications, under an embodiment. The gateway software architecture is relatively thin and efficient, thereby simplifying its integration into other consumer appliances such as set-top boxes, routers, touch screens and security panels. The software architecture also provides a high degree of security against unauthorized access. This section describes the various key components of the gateway software architecture.

The gateway application layer 302 is the main program that orchestrates the operations performed by the gateway. The Security Engine 304 provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

- Encryption including 128-bit SSL encryption for gateway and iConnect server communication to protect user data privacy and provide secure communication.
- Bi-directional authentication between the gateway and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.
- Camera SSL encapsulation because picture and video traffic offered by off-the-shelf networked IP cameras is not secure when traveling over the Internet. The gateway provides for 128-bit SSL encapsulation of the user picture and video data sent over the internet for complete user security and privacy.
- 802.11b/g/n with WPA-2 security to ensure that wireless camera communications always takes place using the strongest available protection.
- A gateway-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying gateway-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Gateway firmware can be remotely download either for one gateway at a time, a group of gateways, or in batches.

The Automations engine 308 manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application. The Schedules Engine 318 then interfaces with SensorConnect 312 to ensure that scheduled events occur at precisely the desired time.

The Device Management module 320 is in charge of all discovery, installation and configuration of both wired and wireless IP devices (e.g., cameras, etc.) coupled or connected to the system. Networked IP devices, such as those used in the integrated security system, require user configuration of many IP and security parameters—to simplify the user experience and reduce the customer support burden, the device management module of an embodiment handles the details of this configuration. The device management module also manages the video routing module described below.

The video routing engine 322 is responsible for delivering seamless video streams to the user with zero-configuration. Through a multi-step, staged approach the video routing engine uses a combination of UPnP port-forwarding, relay server routing and STUN/TURN peer-to-peer routing.

Figure 4:
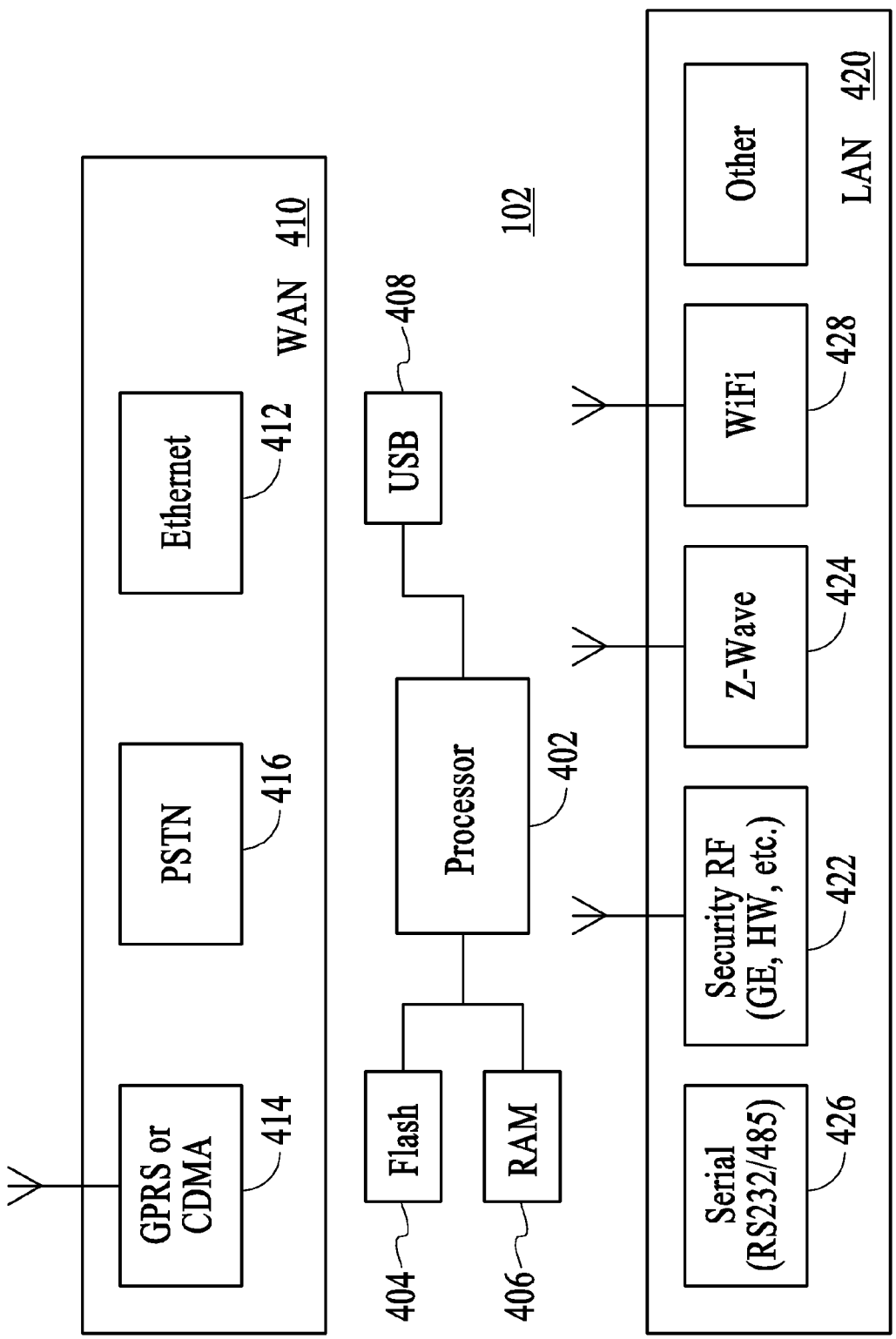
FIG. 4 is a block diagram of the gateway components, under an embodiment.

FIG. 4 is a block diagram of components of the gateway 102, under an embodiment. Depending on the specific set of functionality desired by the service provider deploying the integrated security system service, the gateway 102 can use any of a number of processors 402, due to the small footprint of the gateway application firmware. In an embodiment, the gateway could include the Broadcom BCM5354 as the processor for example. In addition, the gateway 102 includes memory (e.g., FLASH 404, RAM 406, etc.) and any number of input/output (I/O) ports 408.

Referring to the WAN portion 410 of the gateway 102, the gateway 102 of an embodiment can communicate with the iConnect server using a number of communication types and/or protocols, for example Broadband 412, GPRS 414 and/or Public Switched Telephone Network (PTSN) 416 to name a few. In general, broadband communication 412 is the primary means of connection between the gateway 102 and the iConnect server 104 and the GPRS/CDMA 414 and/or PSTN 416 interfaces acts as back-up for fault tolerance in case the user's broadband connection fails for whatever reason, but the embodiment is not so limited.

Referring to the LAN portion 420 of the gateway 102, various protocols and physical transceivers can be used to communicate to off-the-shelf sensors and cameras. The gateway 102 is protocol-agnostic and technology-agnostic and as such can easily support almost any device networking protocol. The gateway 102 can, for example, support GE and Honeywell security RF protocols 422, Z-Wave 424, serial (RS232 and RS485) 426 for direct connection to security panels as well as WiFi 428 (802.11b/g) for communication to WiFi cameras.

The integrated security system includes couplings or connections among a variety of IP devices or components, and the device management module is in charge of the discovery, installation and configuration of the IP devices coupled or connected to the system, as described above. The integrated security system of an embodiment uses a "sandbox" network to discover and manage all IP devices coupled or connected as components of the system. The IP devices of an embodiment include wired devices, wireless devices, cameras, interactive touchscreens, and security panels to name a few. These devices can be wired via ethernet cable or Wifi devices, all of which are secured within the sandbox network, as described below. The "sandbox" network is described in detail below.

Figure 5:
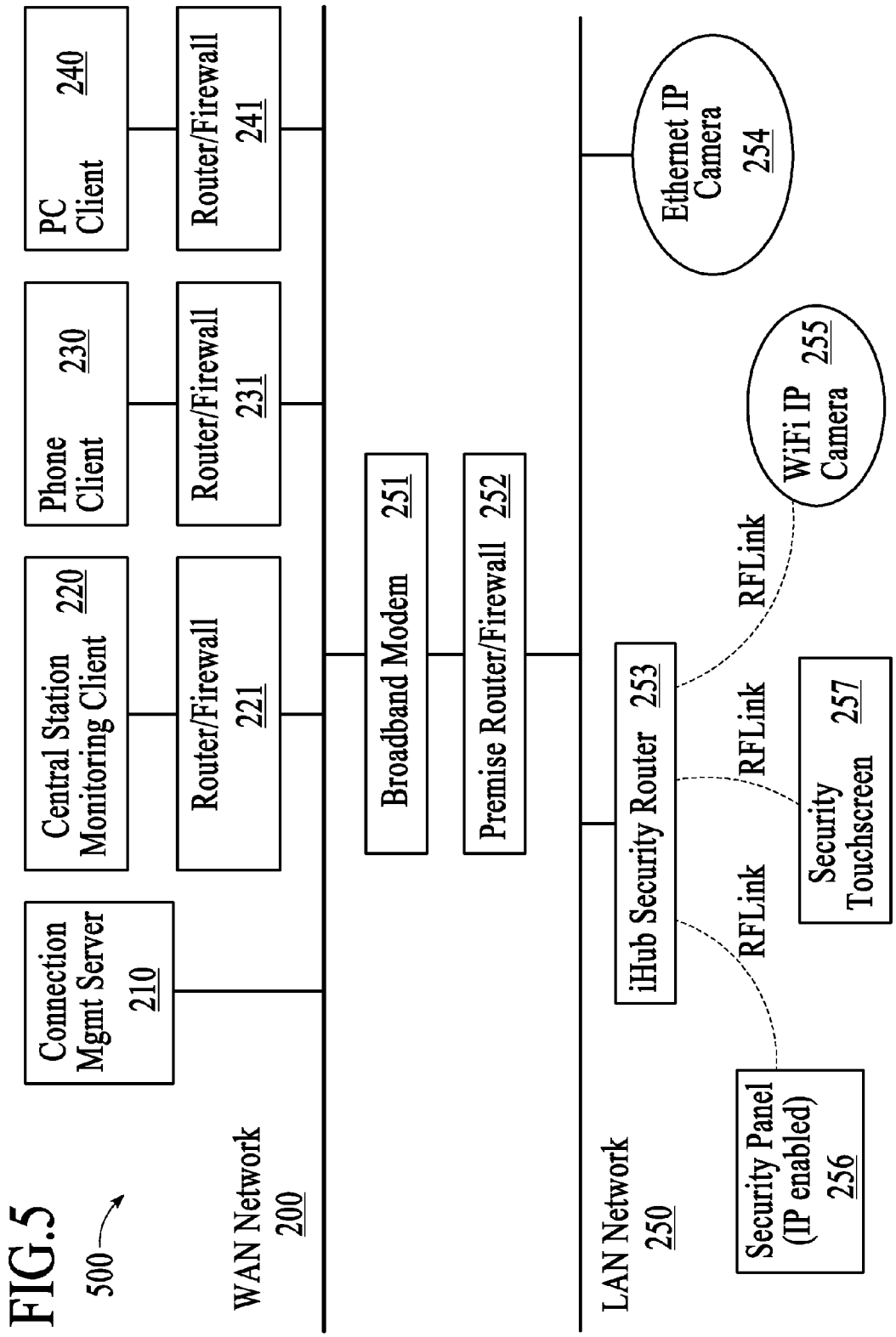
FIG. 5 is a block diagram of IP device integration with a premise network, under an embodiment.

FIG. 5 is a block diagram 500 of network or premise device integration with a premise network 250, under an embodiment. In an embodiment, network devices 255-257 are coupled to the gateway 102 using a secure network connection such as SSL over an encrypted 802.11 link (utilizing for example WPA-2 security for the wireless encryption), and the gateway 102 is coupled to the premise router/firewall 252 via a coupling with a premise LAN 250. The premise router/firewall 252 is coupled to a broadband modem 251, and the broadband modem 251 is coupled to a WAN 200 or other network outside the premise. The gateway 102 thus enables or forms a separate wireless network, or sub-network, that includes some number of devices and is coupled or connected to the LAN 250 of the host premises. The gateway sub-network can include, but is not limited to, any number of other devices like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

Figure 6:
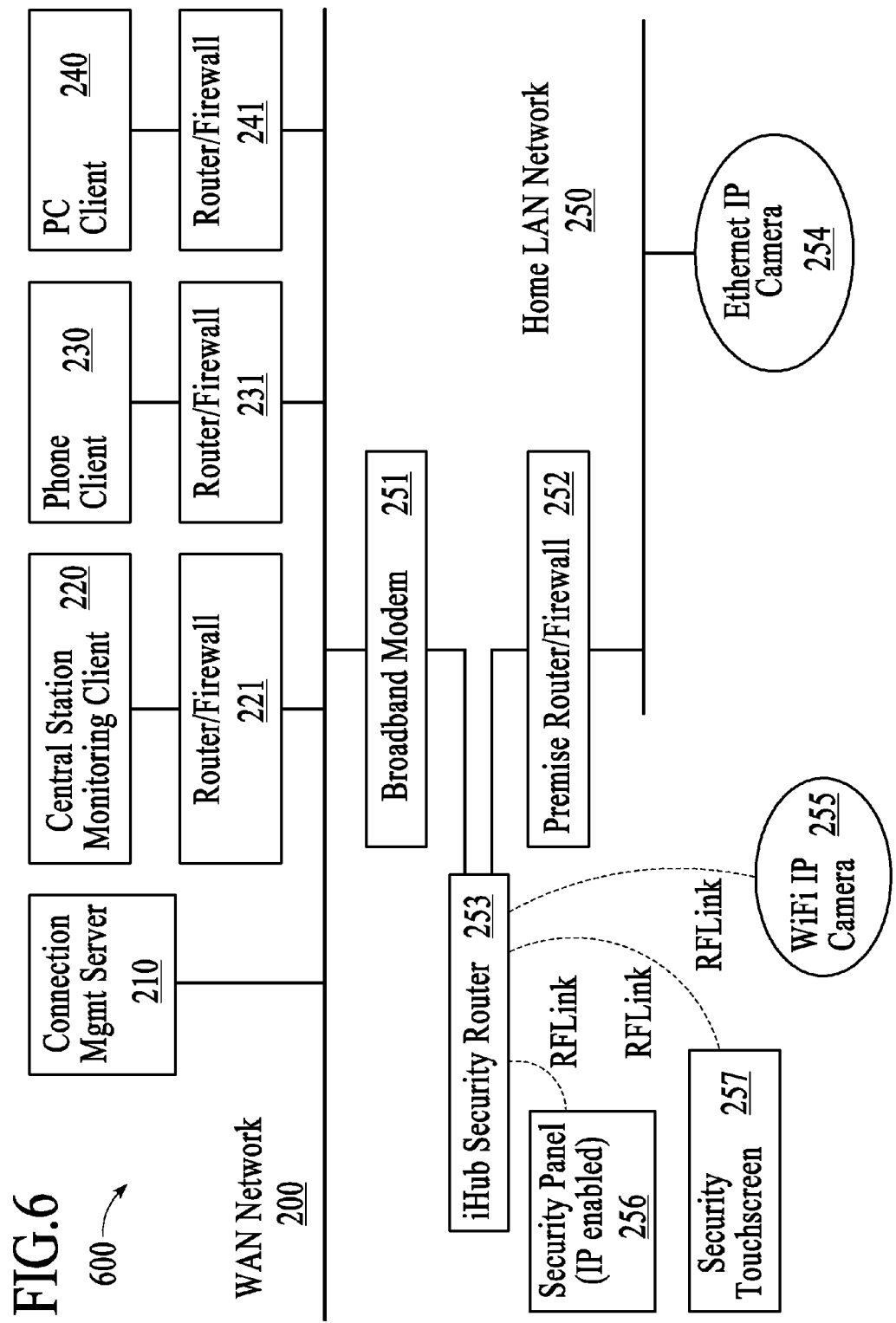
FIG. 6 is a block diagram of IP device integration with a premise network, under an alternative embodiment.

FIG. 6 is a block diagram 600 of network or premise device integration with a premise network 250, under an alternative embodiment. The network or premise devices 255-257 are coupled to the gateway 102, and the gateway 102 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the gateway 102 can be configured or function as the premise router routing specified data between the outside network (e.g., WAN 200) and the premise router/firewall 252 of the LAN 250. As described above, the gateway 102 in this configuration enables or forms a separate wireless network, or sub-network, that includes the network or premise devices 255-257 and is coupled or connected between the LAN 250 of the host premises and the WAN 200. The gateway sub-network can include, but is not limited to, any number of network or premise devices 255-257 like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

The examples described above with reference to FIGS. 5 and 6 are presented only as examples of IP device integration. The integrated security system is not limited to the type, number and/or combination of IP devices shown and described in these examples, and any type, number and/or combination of IP devices is contemplated within the scope of this disclosure as capable of being integrated with the premise network.

The integrated security system of an embodiment includes an iControl touchscreen (also referred to as the touchscreen or integrated security system touchscreen), as described above, which provides core security keypad functionality, content management and presentation, and embedded systems design. The networked security touchscreen system of an embodiment enables a consumer or security provider to easily and automatically install, configure and manage the security system and touchscreen located at a customer premise. Using this system the customer may access and control the local security system, local IP devices such as cameras, local sensors and control devices (such as lighting controls or pipe freeze sensors), as well as the local security system panel and associated security sensors (such as door/window, motion, and smoke detectors). The customer premise may be a home, business, and/or other location equipped with a wired or wireless broadband IP connection. The system of an embodiment includes a touchscreen with a configurable software user interface, a gateway device (e.g., iHub) that couples or connects to the security panel through a wired or wireless connection, a security panel, and a remote server that provides access to content and information from the premises devices to a user when they are remote from the home. Note that the gateway device may be a separate device or may be physically incorporated into the touchscreen.

The touchscreen of an embodiment is integrated into a premise network using the gateway, as described above. The gateway as described herein functions to enable a separate wireless network, or sub-network, that is coupled, connected, or integrated with a network (e.g., WAN, LAN, etc.) of or coupled to the host premises. The sub-network enabled by the gateway optimizes the installation process for IP devices, like the touchscreen, that couple or connect to the sub-network by segregating these IP devices from other such devices on the network. This segregation of the IP devices of the sub-network further enables separate security and privacy policies to be implemented for these IP devices so that, where the IP devices are dedicated to specific functions (e.g., security), the security and privacy policies can be tailored specifically for the specific functions. Furthermore, the gateway and the sub-network it forms enables the segregation of data traffic, resulting in faster and more efficient data flow between components of the host network, components of the sub-network, and between components of the sub-network and components of the network.

The touchscreen of an embodiment includes a core functional embedded system that includes an embedded operating system, required hardware drivers, and an open system interface to name a few. The core functional embedded system can be provided by or as a component of a conventional security system (e.g., security system available from GE Security). These core functional units are used with components of the integrated security system as described herein. Note that portions of the touchscreen description below may include reference to a host premise security system (e.g., GE security system), but these references are included only as an example and do not limit the touchscreen to integration with any particular security system.

As an example, regarding the core functional embedded system, a reduced memory footprint version of embedded Linux forms the core operating system in an embodiment, and provides basic TCP/IP stack and memory management functions, along with a basic set of low-level graphics primitives. A set of device drivers is also provided or included that offer low-level hardware and network interfaces. In addition to the standard drivers, an interface to the RS 485 bus is included that couples or connects to the security system panel (e.g., GE Concord panel). The interface may, for example, implement the Superbus 2000 protocol, which can then be utilized by the more comprehensive transaction-level security functions implemented in PanelConnect technology (e.g SetAlarmLevel (int level, int partition, char *accessCode)). Power control drivers are also provided.

Figure 7:
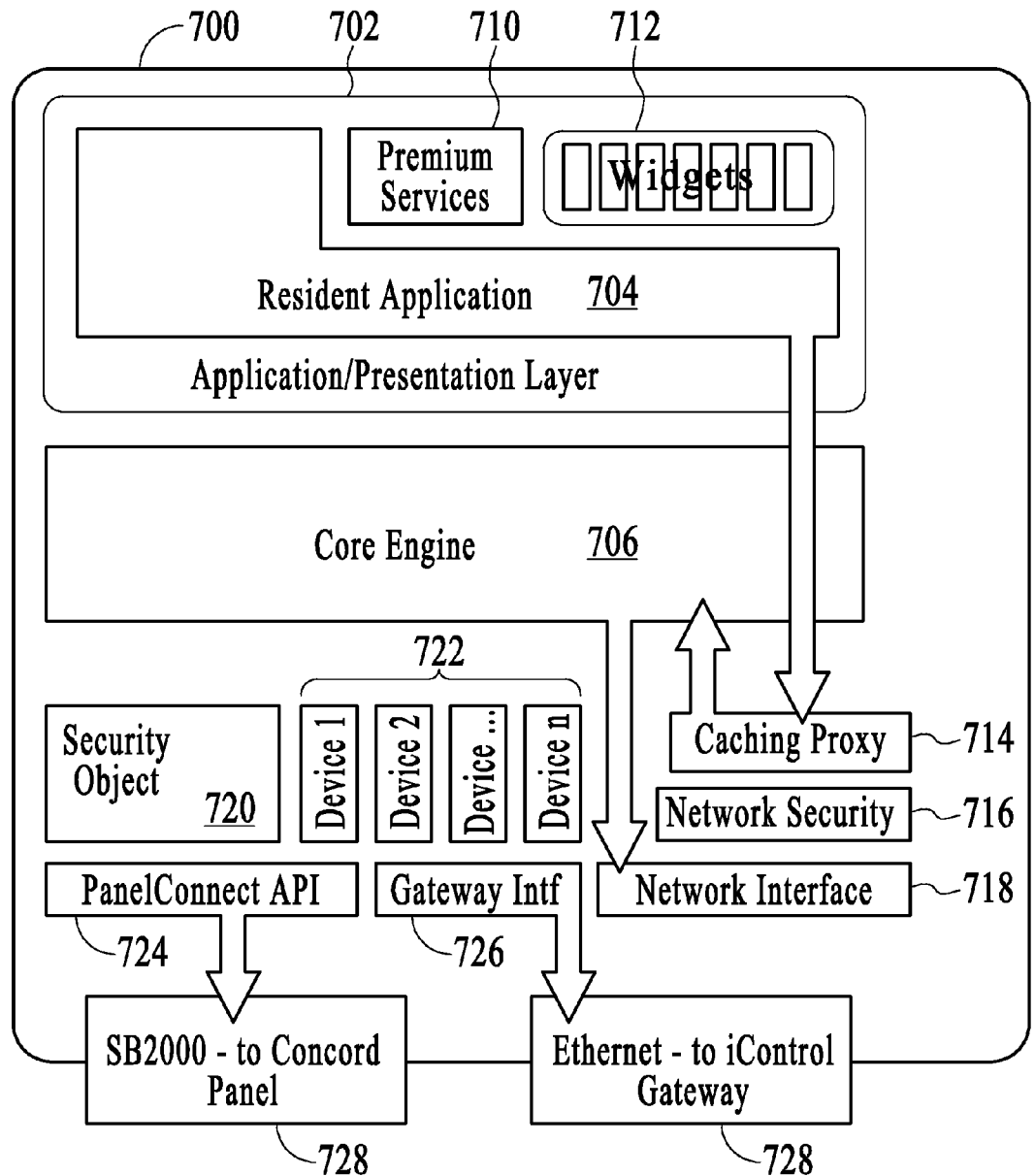
FIG. 7 is a block diagram of a touchscreen, under an embodiment.

FIG. 7 is a block diagram of a touchscreen 700 of the integrated security system, under an embodiment. The touchscreen 700 generally includes an application/presentation layer 702 with a resident application 704, and a core engine 706. The touchscreen 700 also includes one or more of the following, but is not so limited: applications of premium services 710, widgets 712, a caching proxy 714, network security 716, network interface 718, security object 720, applications supporting devices 722, PanelConnect API 724, a gateway interface 726, and one or more ports 728.

More specifically, the touchscreen, when configured as a home security device, includes but is not limited to the following application or software modules: RS 485 and/or RS-232 bus security protocols to conventional home security system panel (e.g., GE Concord panel); functional home security classes and interfaces (e.g. Panel ARM state, Sensor status, etc.); Application/Presentation layer or engine; Resident Application; Consumer Home Security Application; installer home security application; core engine; and System bootloader/Software Updater. The core Application engine and system bootloader can also be used to support other advanced content and applications. This provides a seamless interaction between the premise security application and other optional services such as weather widgets or IP cameras.

An alternative configuration of the touchscreen includes a first Application engine for premise security and a second Application engine for all other applications. The integrated security system application engine supports content standards such as HTML, XML, Flash, etc. and enables a rich consumer experience for all 'widgets', whether security-based or not. The touchscreen thus provides service providers the ability to use web content creation and management tools to build and download any 'widgets' regardless of their functionality.

As discussed above, although the Security Applications have specific low-level functional requirements in order to interface with the premise security system, these applications make use of the same fundamental application facilities as any other 'widget', application facilities that include graphical layout, interactivity, application handoff, screen management, and network interfaces, to name a few.

Content management in the touchscreen provides the ability to leverage conventional web development tools, performance optimized for an embedded system, service provider control of accessible content, content reliability in a consumer device, and consistency between 'widgets' and seamless widget operational environment. In an embodiment of the integrated security system, widgets are created by web developers and hosted on the integrated security system Content Manager (and stored in the Content Store database). In this embodiment the server component caches the widgets and offers them to consumers through the web-based integrated security system provisioning system. The servers interact with the advanced touchscreen using HTTPS interfaces controlled by the core engine and dynamically download widgets and updates as needed to be cached on the touchscreen. In other embodiments widgets can be accessed directly over a network such as the Internet without needing to go through the iControl Content Manager Referring to FIG. 7, the touchscreen system is built on a tiered architecture, with defined interfaces between the Application/Presentation Layer (the Application Engine) on the top, the Core Engine in the middle, and the security panel and gateway APIs at the lower level. The architecture is configured to provide maximum flexibility and ease of maintenance.

The application engine of the touchscreen provides the presentation and interactivity capabilities for all applications (widgets) that run on the touchscreen, including both core security function widgets and third party content widgets. A fundamental component of the application engine is the Presentation Engine, which includes a set of libraries that implement the standards-based widget content (e.g., XML, HTML, JavaScript, Flash) layout and interactivity. This engine provides the widget with interfaces to dynamically load both graphics and application logic from third parties, support high level data description language as well as standard graphic formats. The set of web content-based functionality available to a widget developer is extended by specific touchscreen functions implemented as local web services by the Core Engine.

The resident application of the touchscreen is the master service that controls the interaction of all widgets (all applications in the system), and enforces the business and security rules required by the service provider. For example, the resident application determines the priority of widgets, thereby enabling a home security widget to override resource requests from a less critical widget (e.g. a weather widget). The resident application also monitors widget behavior, and responds to client or server requests for cache updates.

The core engine of the touchscreen manages interaction with other components of the integrated security system, and provides an interface through which the resident application and authorized widgets can get information about the home security system, set alarms, install sensors, etc. At the lower level, the Core Engine's main interactions are through the PanelConnect API, which handles all communication with the security panel, and the gateway Interface, which handles communication with the gateway. In an embodiment, both the iHub Interface and PanelConnect API are resident and operating on the touchscreen. In another embodiment, the PanelConnect API runs on the gateway or other device that provides security system interaction and is accessed by the touchscreen through a web services interface.

The Core Engine also handles application and service level persistent and cached memory functions, as well as the dynamic provisioning of content and widgets, including but not limited to: flash memory management, local widget and content caching, widget version management (download, cache flush new/old content versions), as well as the caching and synchronization of user preferences. As a portion of these services the Core engine incorporates the bootloader functionality that is responsible for maintaining a consistent software image on the touchscreen, and acts as the client agent for all software updates. The bootloader is configured to ensure full update redundancy so that unsuccessful downloads cannot corrupt the integrated security system.

Video management is provided as a set of web services by the Core Engine. Video management includes the retrieval and playback of local video feeds as well as remote control and management of cameras (all through iControl Camera-Connect technology).

Both the high level application layer and the mid-level core engine of the touchscreen can make calls to the network. Any call to the network made by the application layer is automatically handed off to a local caching proxy, which determines whether the request should be handled locally. Many of the requests from the application layer are web services API requests; although such requests could be satisfied by the iControl servers, they are handled directly by the touchscreen and the gateway. Requests that get through the caching proxy are checked against a white list of acceptable sites, and, if they match, are sent off through the network interface to the gateway. Included in the Network Subsystem is a set of network services including HTTP, HTTPS, and server-level authentication functions to manage the secure client-server interface. Storage and management of certificates is incorporated as a part of the network services layer.

Server components of the integrated security system servers support interactive content services on the touchscreen. These server components include, but are not limited to the content manager, registry manager, network manager, and global registry, each of which is described herein.

The Content Manager oversees aspects of handling widget data and raw content on the touchscreen. Once created and validated by the service provider, widgets are 'ingested' to the Content Manager, and then become available as downloadable services through the integrated security system Content Management APIs. The Content manager maintains versions and timestamp information, and connects to the raw data contained in the backend Content Store database. When a widget is updated (or new content becomes available) all clients registering interest in a widget are systematically updated as needed (a process that can be configured at an account, locale, or system-wide level).

The Registry Manager handles user data, and provisioning accounts, including information about widgets the user has decided to install, and the user preferences for these widgets.

The Network Manager handles getting and setting state for all devices on the integrated security system network (e.g., sensors, panels, cameras, etc.). The Network manager synchronizes with the gateway, the advanced touchscreen, and the subscriber database.

The Global Registry is a primary starting point server for all client services, and is a logical referral service that abstracts specific server locations/addresses from clients (touchscreen, gateway 102, desktop widgets, etc.). This approach enables easy scaling/migration of server farms.

The gateway 102 of an embodiment, as described herein, enables couplings or connections and thus the flow of information between various components of the host premises and various types and/or combinations of IP devices, where the components of the host premises include a network, a security system or subsystem to name a few. Consequently, the gateway 102 controls the association between and the flow of information or data between the components of the host premises. For example, the gateway 102 of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

Figure 8:
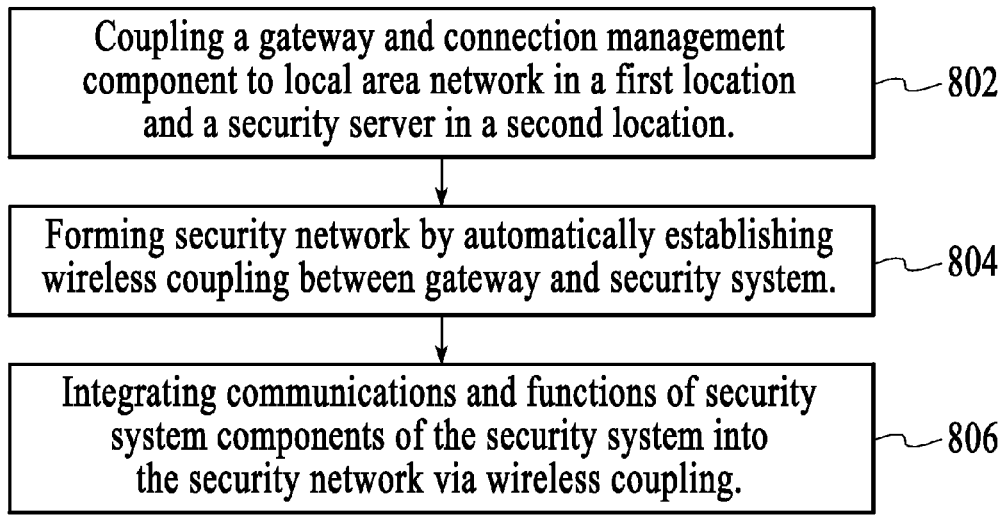
FIG. 8 is a flow diagram for a method of forming a security network including integrated security system components, under an embodiment.

FIG. 8 is a flow diagram for a method 800 of forming a security network including integrated security system components, under an embodiment. Generally, the method comprises coupling 802 a gateway comprising a connection management component to a local area network in a first location and a security server in a second location. The method comprises forming 804 a security network by automatically establishing a wireless coupling between the gateway and a security system using the connection management component. The security system of an embodiment comprises security system components located at the first location. The method comprises integrating 806 communications and functions of the security system components into the security network via the wireless coupling.

Figure 9:
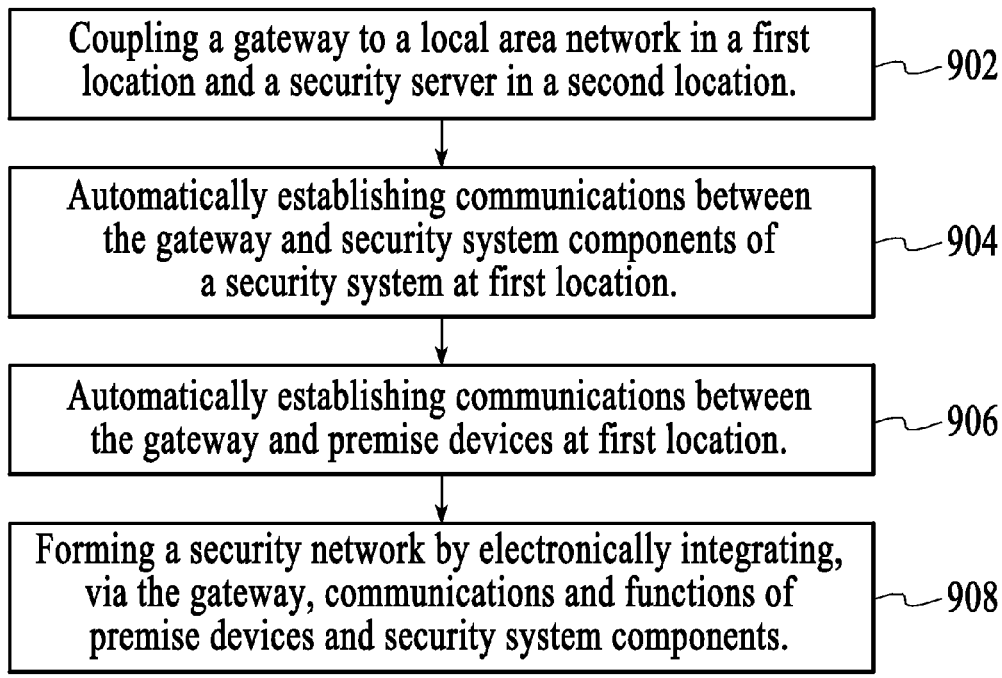
FIG. 9 is a flow diagram for a method of forming a security network including integrated security system components and network devices, under an embodiment.

FIG. 9 is a flow diagram for a method 900 of forming a security network including integrated security system components and network devices, under an embodiment. Generally, the method comprises coupling 902 a gateway to a local area network located in a first location and a security server in a second location. The method comprises automatically establishing 904 communications between the gateway and security system components at the first location, the security system including the security system components. The method comprises automatically establishing 906 communications between the gateway and premise devices at the first location. The method comprises forming 908 a security network by electronically integrating, via the gateway, communications and functions of the premise devices and the security system components.

Figure 10:
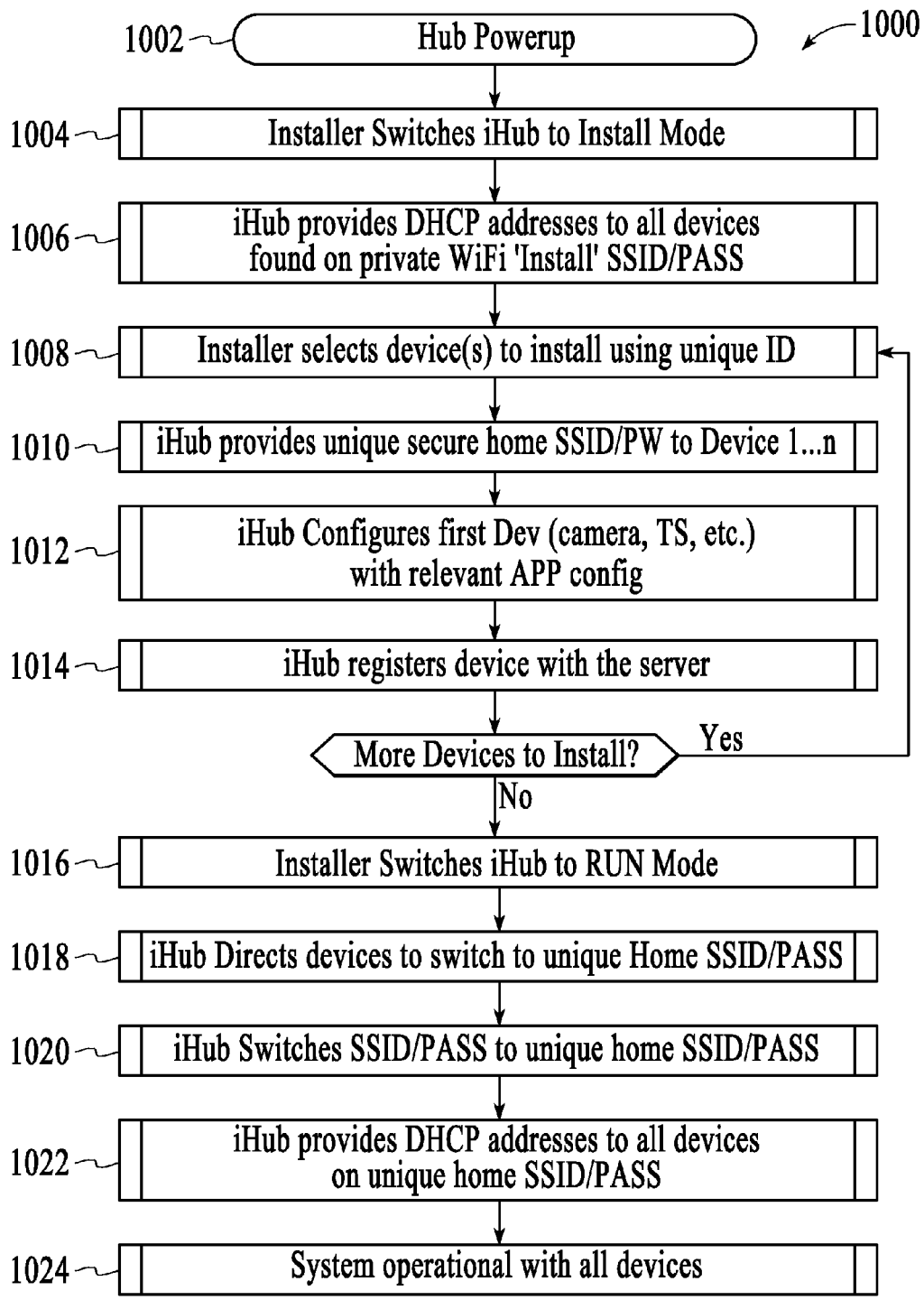
FIG. 10 is a flow diagram for installation of an IP device into a private network environment, under an embodiment.

In an example embodiment, FIG. 10 is a flow diagram 1000 for integration or installation of an IP device into a private network environment, under an embodiment. The variables of an embodiment set at time of installation include, but are not limited to, one or more of a private SSID/Password, an gateway identifier, a security panel identifier, a user account TS, and a Central Monitoring Station account identification.

An embodiment of the IP device discovery and management begins with a user or installer activating 1002 the gateway and initiating 1004 the install mode of the system. This places the gateway in an install mode. Once in install mode, the gateway shifts to a default (Install) Wifi configuration. This setting will match the default setting for other integrated security system-enabled devices that have been pre-configured to work with the integrated security system. The gateway will then begin to provide 1006 DHCP addresses for these IP devices. Once the devices have acquired a new DHCP address from the gateway, those devices are available for configuration into a new secured Wifi network setting.

The user or installer of the system selects 1008 all devices that have been identified as available for inclusion into the integrated security system. The user may select these devices by their unique IDs via a web page, Touchscreen, or other client interface. The gateway provides 1010 data as appropriate to the devices. Once selected, the devices are configured 1012 with appropriate secured Wifi settings, including SSID and WPA/WPA-2 keys that are used once the gateway switches back to the secured sandbox configuration from the "Install" settings. Other settings are also configured as appropriate for that type of device. Once all devices have been configured, the user is notified and the user can exit install mode. At this point all devices will have been registered 1014 with the integrated security system servers.

The installer switches 1016 the gateway to an operational mode, and the gateway instructs or directs 1018 all newly configured devices to switch to the "secured" Wifi sandbox settings. The gateway then switches 1020 to the "secured" Wifi settings. Once the devices identify that the gateway is active on the "secured" network, they request new DHCP addresses from the gateway which, in response, provides 1022 the new addresses. The devices with the new addresses are then operational 1024 on the secured network.

In order to ensure the highest level of security on the secured network, the gateway can create or generate a dynamic network security configuration based on the unique ID and private key in the gateway, coupled with a randomizing factor that can be based on online time or other inputs. This guarantees the uniqueness of the gateway secured network configuration.

To enable the highest level of performance, the gateway analyzes the RF spectrum of the 802.11x network and determines which frequency band/channel it should select to run.

An alternative embodiment of the camera/IP device management process leverages the local ethernet connection of the sandbox network on the gateway. This alternative process is similar to the Wifi discovery embodiment described above, except the user connects the targeted device to the ethernet port of the sandbox network to begin the process. This alternative embodiment accommodates devices that have not been pre-configured with the default "Install" configuration for the integrated security system.

This alternative embodiment of the IP device discovery and management begins with the user/installer placing the system into install mode. The user is instructed to attach an IP device to be installed to the sandbox ethernet port of the gateway. The IP device requests a DHCP address from the gateway which, in response to the request, provides the address. The user is presented the device and is asked if he/she wants to install the device. If yes, the system configures the device with the secured Wifi settings and other device-specific settings (e.g., camera settings for video length, image quality etc.). The user is next instructed to disconnect the device from the ethernet port. The device is now available for use on the secured sandbox network.

Figure 11:
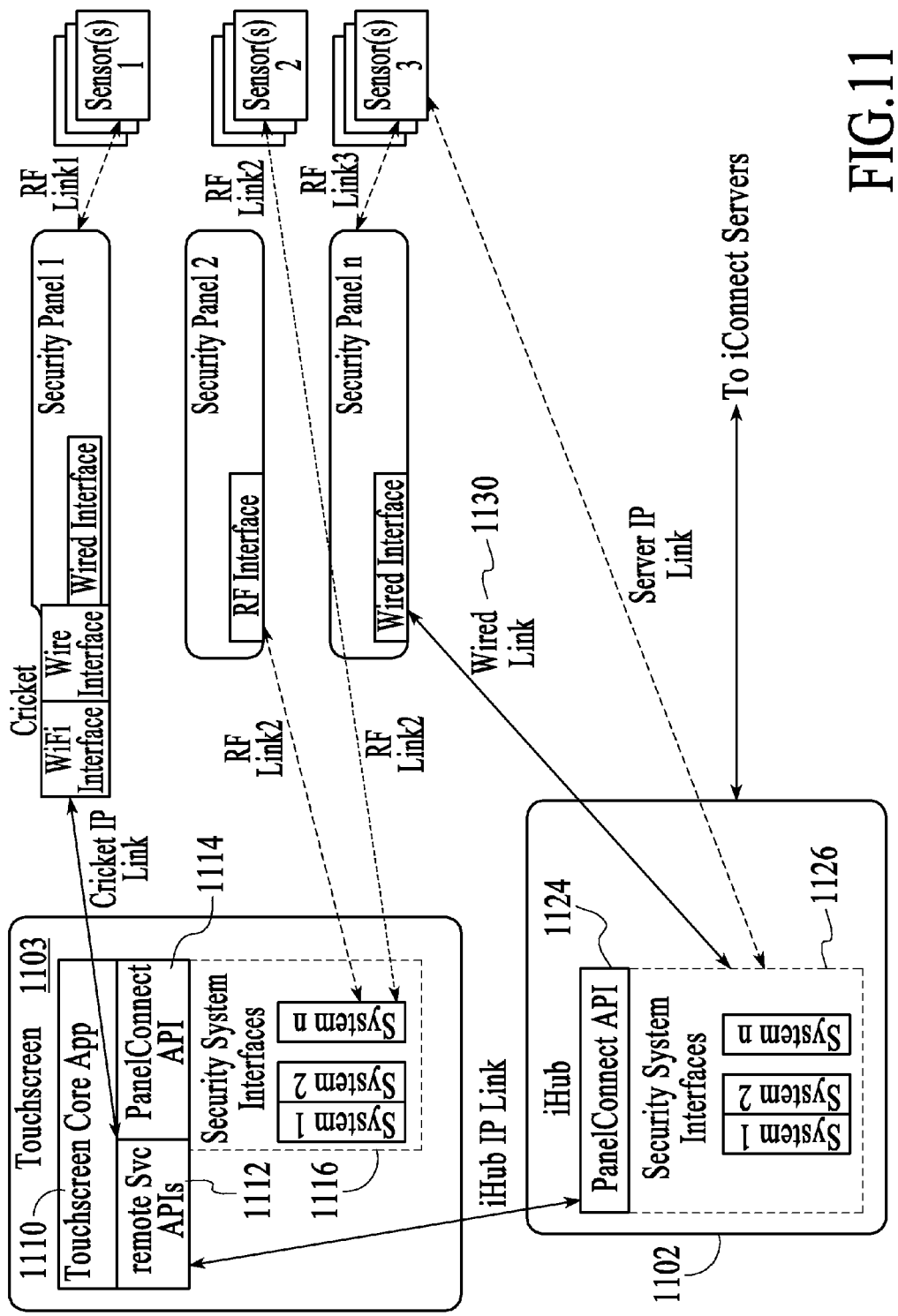
FIG. 11 is a block diagram showing communications among IP devices of the private network environment, under an embodiment.

FIG. 11 is a block diagram showing communications among integrated IP devices of the private network environment, under an embodiment. The IP devices of this example include a security touchscreen 1103, gateway 1102 (e.g., "iHub"), and security panel (e.g., "Security Panel 1", "Security Panel 2", "Security Panel n"), but the embodiment is not so limited. In alternative embodiments any number and/or combination of these three primary component types may be combined with other components including IP devices and/or security system components. For example, a single device which comprises an integrated gateway, touchscreen, and security panel is merely another embodiment of the integrated security system described herein. The description that follows includes an example configuration that includes a touchscreen hosting particular applications. However, the embodiment is not limited to the touchscreen hosting these applications, and the touchscreen should be thought of as representing any IP device.

Referring to FIG. 11, the touchscreen 1103 incorporates an application 1110 that is implemented as computer code resident on the touchscreen operating system, or as a web-based application running in a browser, or as another type of scripted application (e.g., Flash, Java, Visual Basic, etc.). The touchscreen core application 1110 represents this application, providing user interface and logic for the end user to manage their security system or to gain access to networked information or content (Widgets). The touchscreen core application 1110 in turn accesses a library or libraries of functions to control the local hardware (e.g. screen display, sound, LEDs, memory, etc.) as well as specialized librarie(s) to couple or connect to the security system.

In an embodiment of this security system connection, the touchscreen 1103 communicates to the gateway 1102, and has no direct communication with the security panel. In this embodiment, the touchscreen core application 1110 accesses the remote service APIs 1112 which provide security system functionality (e.g. ARM/DISARM panel, sensor state, get/set panel configuration parameters, initiate or get alarm events, etc.). In an embodiment, the remote service APIs 1112 implement one or more of the following functions, but the embodiment is not so limited:

Armstate=setARMState(type="ARM STAY|ARM AWAY|DISARM",
   Parameters="ExitDelay=30|Lights=OFF")
sensorState=getSensors
   (type="ALL|SensorName|SensorNameList")
result=setSensorState(SensorName,
   parameters="Option1, Options2, . . . Option n")
interruptHandler=SensorEvent( )
interruptHandler=alarmEvent( )

Functions of the remote service APIs 1112 of an embodiment use a remote PanelConnect API 1124 which which resides in memory on the gateway 1102. The touchscreen 1103 communicates with the gateway 1102 through a suitable network interface such as an Ethernet or 802.11 RF connection, for example. The remote PanelConnect API 1124 provides the underlying Security System Interfaces 1126 used to communicate with and control one or more types of security panel via wired link 1130 and/or RF link 3. The PanelConnect API 1124 provides responses and input to the remote services APIs 1126, and in turn translates function calls and data to and from the specific protocols and functions supported by a specific implementation of a Security Panel (e.g. a GE Security Simon XT or Honeywell Vista 20P). In an embodiment, the PanelConnect API 1124 uses a 345 MHz RF transceiver or receiver hardware/firmware module to communicate wirelessly to the security panel and directly to a set of 345 MHz RF-enabled sensors and devices, but the embodiment is not so limited.

The gateway of an alternative embodiment communicates over a wired physical coupling or connection to the security panel using the panel's specific wired hardware (bus) interface and the panel's bus-level protocol.

In an alternative embodiment, the Touchscreen 1103 implements the same PanelConnect API 1114 locally on the Touchscreen 1103, communicating directly with the Security Panel 2 and/or Sensors 2 over the proprietary RF link or over a wired link for that system. In this embodiment the Touchscreen 1103, instead of the gateway 1102, incorporates the 345 MHz RF transceiver to communicate directly with Security Panel 2 or Sensors 2 over the RF link 2. In the case of a wired link the Touchscreen 1103 incorporates the real-time hardware (e.g. a PIC chip and RS232-variant serial link) to physically connect to and satisfy the specific bus-level timing requirements of the SecurityPanel2.

In yet another alternative embodiment, either the gateway 1102 or the Touchscreen 1103 implements the remote service APIs. This embodiment includes a Cricket device ("Cricket") which comprises but is not limited to the following components: a processor (suitable for handling 802.11 protocols and processing, as well as the bus timing requirements of SecurityPanel 1); an 802.11 (WiFi) client IP interface chip; and, a serial bus interface chip that implements variants of RS232 or RS485, depending on the specific Security Panel.

The Cricket also implements the full PanelConnect APIs such that it can perform the same functions as the case where the gateway implements the PanelConnect APIs. In this embodiment, the touchscreen core application 1110 calls functions in the remote service APIs 1112 (such as setArmState( )). These functions in turn couple or connect to the remote Cricket through a standard IP connection ("Cricket IP Link") (e.g., Ethernet, Homeplug, the gateway's proprietary Wifi network, etc.). The Cricket in turn implements the PanelConnect API, which responds to the request from the touchscreen core application, and performs the appropriate function using the proprietary panel interface. This interface uses either the wireless or wired proprietary protocol for the specific security panel and/or sensors.

Figure 12:
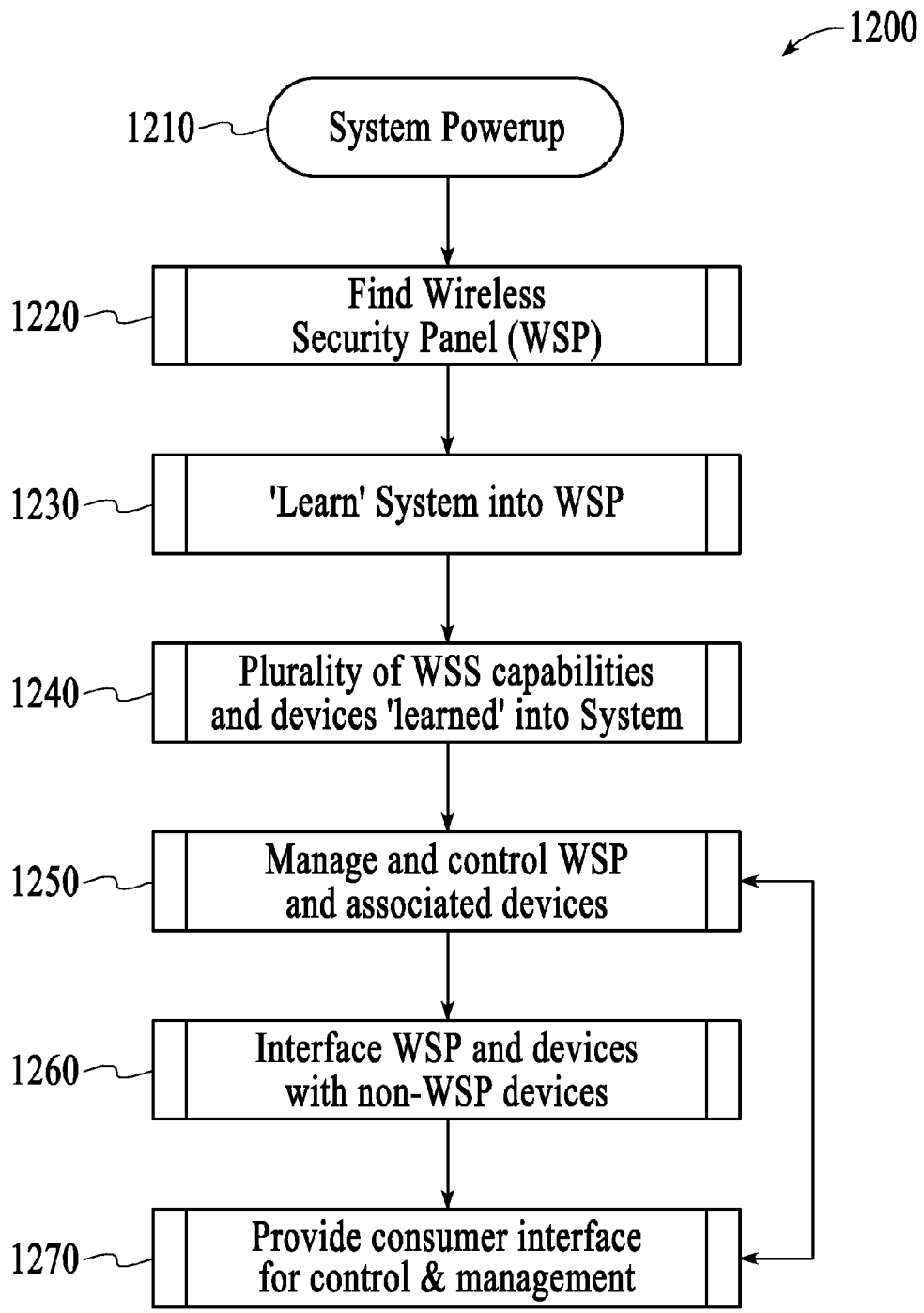
FIG. 12 is a flow diagram of a method of integrating an external control and management application system with an existing security system, under an embodiment.

FIG. 12 is a flow diagram of a method of integrating an external control and management application system with an existing security system, under an embodiment. Operations begin when the system is powered on 1210, involving at a minimum the power-on of the gateway device, and optionally the power-on of the connection between the gateway device and the remote servers. The gateway device initiates 1220 a software and RF sequence to locate the extant security system. The gateway and installer initiate and complete 1230 a sequence to 'learn' the gateway into the security system as a valid and authorized control device. The gateway initiates 1240 another software and RF sequence of instructions to discover and learn the existence and capabilities of existing RF devices within the extant security system, and store this information in the system. These operations under the system of an embodiment are described in further detail below.

Unlike conventional systems that extend an existing security system, the system of an embodiment operates utilizing the proprietary wireless protocols of the security system manufacturer. In one illustrative embodiment, the gateway is an embedded computer with an IP LAN and WAN connection and a plurality of RF transceivers and software protocol modules capable of communicating with a plurality of security systems each with a potentially different RF and software protocol interface. After the gateway has completed the discovery and learning 1240 of sensors and has been integrated 1250 as a virtual control device in the extant security system, the system becomes operational. Thus, the security system and associated sensors are presented 1250 as accessible devices to a potential plurality of user interface subsystems.

The system of an embodiment integrates 1260 the functionality of the extant security system with other non-security devices including but not limited to IP cameras, touchscreens, lighting controls, door locking mechanisms, which may be controlled via RF, wired, or powerline-based networking mechanisms supported by the gateway or servers.

The system of an embodiment provides a user interface subsystem 1270 enabling a user to monitor, manage, and control the system and associated sensors and security systems. In an embodiment of the system, a user interface subsystem is an HTML/XML/Javascript/Java/AJAX/Flash presentation of a monitoring and control application, enabling users to view the state of all sensors and controllers in the extant security system from a web browser or equivalent operating on a computer, PDA, mobile phone, or other consumer device.

In another illustrative embodiment of the system described herein, a user interface subsystem is an HTML/XML/Javascript/Java/AJAX presentation of a monitoring and control application, enabling users to combine the monitoring and control of the extant security system and sensors with the monitoring and control of non-security devices including but not limited to IP cameras, touchscreens, lighting controls, door locking mechanisms.

In another illustrative embodiment of the system described herein, a user interface subsystem is a mobile phone application enabling users to monitor and control the extant security system as well as other non-security devices.

In another illustrative embodiment of the system described herein, a user interface subsystem is an application running on a keypad or touchscreen device enabling users to monitor and control the extant security system as well as other non-security devices.

In another illustrative embodiment of the system described herein, a user interface subsystem is an application operating on a TV or set-top box connected to a TV enabling users to monitor and control the extant security system as well as other non-security devices.

Figure 13:
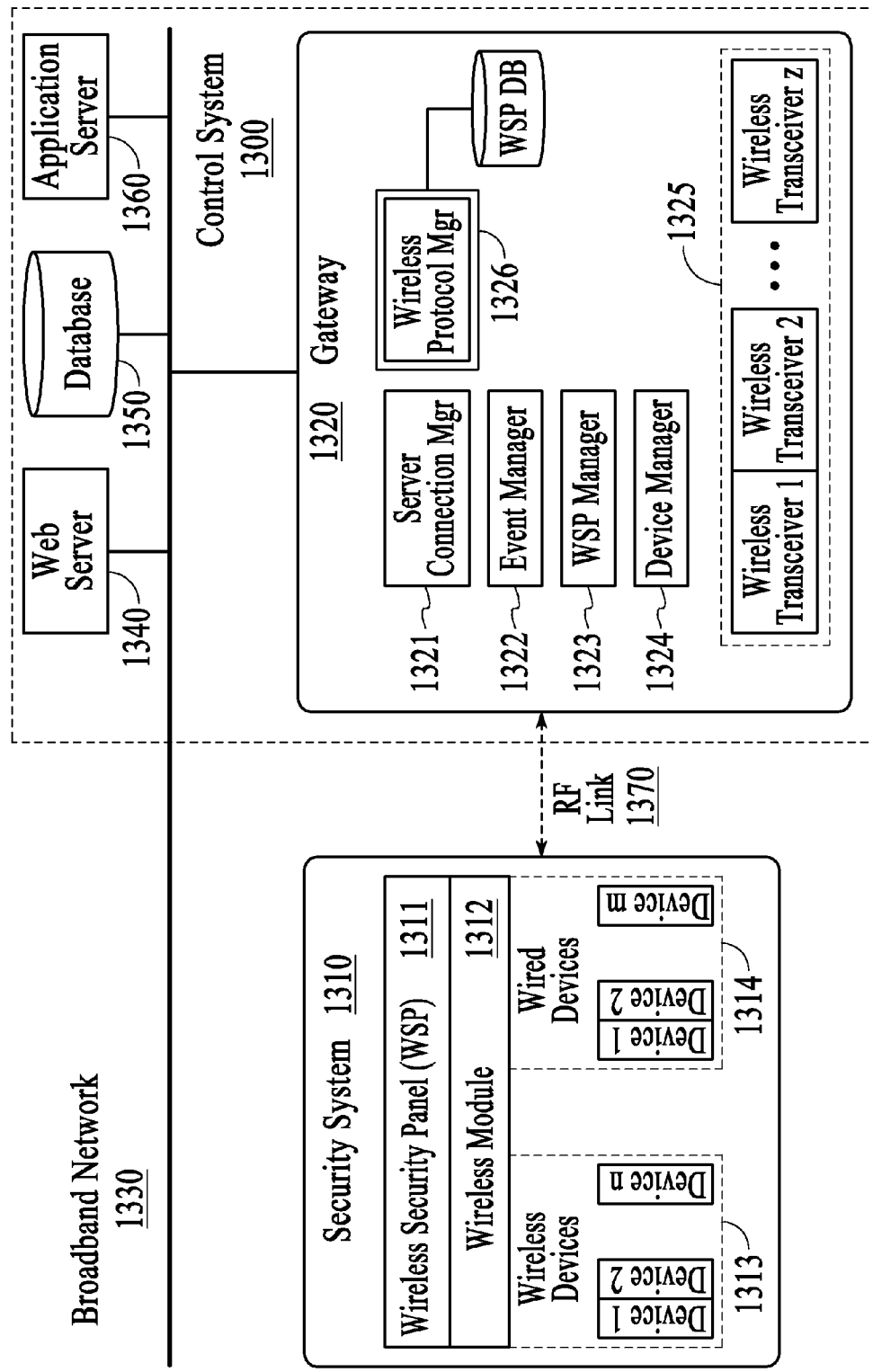
FIG. 13 is a block diagram of an integrated security system 1300 wirelessly interfacing to proprietary security systems, under an embodiment.

FIG. 13 is a block diagram of an integrated security system 1300 wirelessly interfacing to proprietary security systems, under an embodiment. A security system 1310 is coupled or connected to a Gateway 1320, and from Gateway 1320 coupled or connected to a plurality of information and content sources across a network 1330 including one or more web servers 1340, system databases 1350, and applications servers 1360. While in one embodiment network 1330 is the Internet, including the World Wide Web, those of skill in the art will appreciate that network 1330 may be any type of network, such as an intranet, an extranet, a virtual private network (VPN), a mobile network, or a non-TCP/IP based network.

Moreover, other elements of the system of an embodiment may be conventional, well-known elements that need not be explained in detail herein. For example, security system 1310 could be any type home or business security system, such devices including but not limited to a standalone RF home security system or a non-RF-capable wired home security system with an add-on RF interface module. In the example of FIG. 13, security system 1310 includes an RF-capable wireless security panel (WSP) 1311 that acts as the master controller for security system 1310. Well-known examples of such a WSP include the GE Security Concord, Networx, and Simon panels, the Honeywell Vista and Lynx panels, and similar panels from DSC and Napco, to name a few. A wireless module 1314 includes the RF hardware and protocol software necessary to enable communication with and control of a plurality of wireless devices 1313. WSP 1311 may also manage wired devices 1314 physically connected to WSP 1311 with an RS232 or RS485 or Ethernet connection or similar such wired interface.

In an implementation consistent with the systems and methods described herein, Gateway 1320 provides the interface between security system 1310 and LAN and/or WAN for purposes of remote control, monitoring, and management. Gateway 1320 communicates with an external web server 1340, database 1350, and application server 1360 over network 1330 (which may comprise WAN, LAN, or a combination thereof). In this example system, application logic, remote user interface functionality, as well as user state and account are managed by the combination of these remote servers. Gateway 1320 includes server connection manager 1321, a software interface module responsible for all server communication over network 1330. Event manager 1322 implements the main event loop for Gateway 1320, processing events received from device manager 1324 (communicating with non-security system devices including but not limited to IP cameras, wireless thermostats, or remote door locks). Event manager 1322 further processes events and control messages from and to security system 1310 by utilizing WSP manager 1323.

WSP manager 1323 and device manager 1324 both rely upon wireless protocol manager 1326 which receives and stores the proprietary or standards-based protocols required to support security system 1310 as well as any other devices interfacing with gateway 1320. WSP manager 1323 further utilizes the comprehensive protocols and interface algorithms for a plurality of security systems 1310 stored in the WSP DB client database associated with wireless protocol manager 1326. These various components implement the software logic and protocols necessary to communicate with and manager devices and security systems 1310. Wireless Transceiver hardware modules 1325 are then used to implement the physical RF communications link to such devices and security systems 1310. An illustrative wireless transceiver 1325 is the GE Security Dialog circuit board, implementing a 319.5 MHz two-way RF transceiver module. In this example, RF Link 1370 represents the 319.5 MHz RF communication link, enabling gateway 1320 to monitor and control WSP 1311 and associated wireless and wired devices 1313 and 1314, respectively.

In one embodiment, server connection manager 1321 requests and receives a set of wireless protocols for a specific security system 1310 (an illustrative example being that of the GE Security Concord panel and sensors) and stores them in the WSP DB portion of the wireless protocol manager 1326. WSP manager 1323 then utilizes such protocols from wireless protocol manager 1326 to initiate the sequence of processes detailed in FIG. 12 and FIG. 13 for learning gateway 1320 into security system 1310 as an authorized control device. Once learned in, as described with reference to FIG. 13 (and above), event manager 1322 processes all events and messages detected by the combination of WSP manager 1323 and the GE Security wireless transceiver module 1325.

In another embodiment, gateway 1320 incorporates a plurality of wireless transceivers 1325 and associated protocols managed by wireless protocol manager 1326. In this embodiment events and control of multiple heterogeneous devices may be coordinated with WSP 1311, wireless devices 1313, and wired devices 1314. For example a wireless sensor from one manufacturer may be utilized to control a device using a different protocol from a different manufacturer.

In another embodiment, gateway 1320 incorporates a wired interface to security system 1310, and incorporates a plurality of wireless transceivers 1325 and associated protocols managed by wireless protocol manager 1326. In this embodiment events and control of multiple heterogeneous devices may be coordinated with WSP 1311, wireless devices 1313, and wired devices 1314.

Of course, while an illustrative embodiment of an architecture of the system of an embodiment is described in detail herein with respect to FIG. 13, one of skill in the art will understand that modifications to this architecture may be made without departing from the scope of the description presented herein. For example, the functionality described herein may be allocated differently between client and server, or amongst different server or processor-based components. Likewise, the entire functionality of the gateway 1320 described herein could be integrated completely within an existing security system 1310. In such an embodiment, the architecture could be directly integrated with a security system 1310 in a manner consistent with the currently described embodiments.

Figure 14:
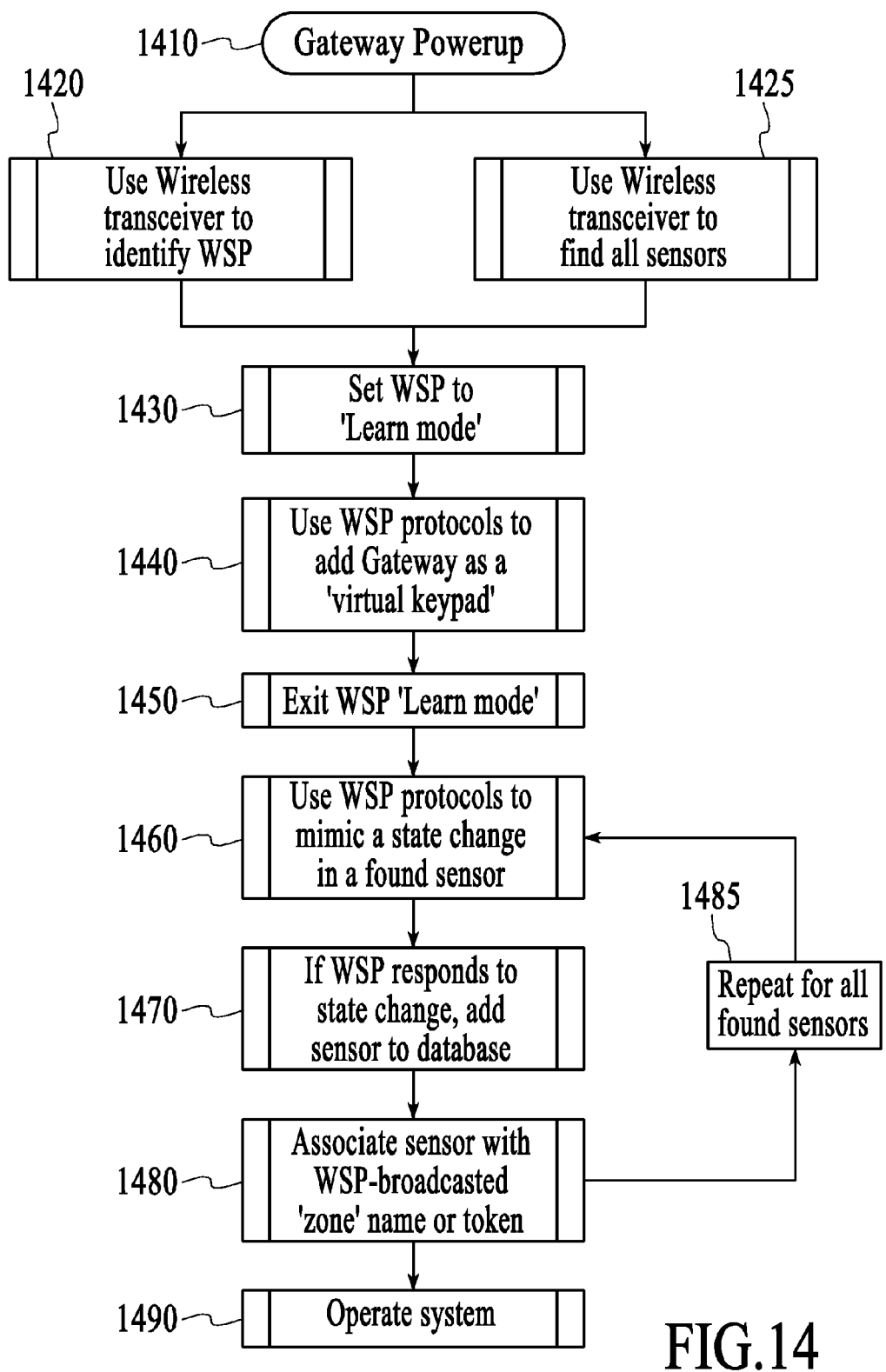
FIG. 14 is a flow diagram for wirelessly 'learning' the gateway into an existing security system and discovering extant sensors, under an embodiment.

FIG. 14 is a flow diagram for wirelessly 'learning' the Gateway into an existing security system and discovering extant sensors, under an embodiment. The learning interfaces gateway 1320 with security system 1310. Gateway 1320 powers up 1410 and initiates software sequences 1420 and 1425 to identify accessible WSPs 1311 and wireless devices 1313, respectively (e.g., one or more WSPs and/or devices within range of gateway 1320). Once identified, WSP 1311 is manually or automatically set into 'learn mode' 1430, and gateway 1320 utilizes available protocols to add 1440 itself as an authorized control device in security system 1310. Upon successful completion of this task, WSP 1311 is manually or automatically removed from 'learn mode' 1450.

Gateway 1320 utilizes the appropriate protocols to mimic 1460 the first identified device 1314. In this operation gateway 1320 identifies itself using the unique or pseudo-unique identifier of the first found device 1314, and sends an appropriate change of state message over RF Link 1370. In the event that WSP 1311 responds to this change of state message, the device 1314 is then added 1470 to the system in database 1350. Gateway 1320 associates 1480 any other information (such as zone name or token-based identifier) with this device 1314 in database 1350, enabling gateway 1320, user interface modules, or any application to retrieve this associated information.

In the event that WSP 1311 does not respond to the change of state message, the device 1314 is not added 1470 to the system in database 1350, and this device 1314 is identified as not being a part of security system 1310 with a flag, and is either ignored or added as an independent device, at the discretion of the system provisioning rules. Operations hereunder repeat 1485 operations 1460, 1470, 1480 for all devices 1314 if applicable. Once all devices 1314 have been tested in this way, the system begins operation 1490.

In another embodiment, gateway 1320 utilizes a wired connection to WSP 1311, but also incorporates a wireless transceiver 1325 to communicate directly with devices 1314. In this embodiment, operations under 1420 above are removed, and operations under 1440 above are modified so the system of this embodiment utilizes wireline protocols to add itself as an authorized control device in security system 1310.

A description of an example embodiment follows in which the Gateway (FIG. 13, element 1320) is the iHub available from iControl Networks, Palo Alto, Calif., and described in detail herein. In this example the gateway is "automatically" installed with a security system.

The automatic security system installation begins with the assignment of an authorization key to components of the security system (e.g., gateway, kit including the gateway, etc.). The assignment of an authorization key is done in lieu of creating a user account. An installer later places the gateway in a user's premises along with the premises security system. The installer uses a computer to navigate to a web portal (e.g., integrated security system web interface), logs in to the portal, and enters the authorization key of the installed gateway into the web portal for authentication. Once authenticated, the gateway automatically discovers devices at the premises (e.g., sensors, cameras, light controls, etc.) and adds the discovered devices to the system or "network". The installer assigns names to the devices, and tests operation of the devices back to the server (e.g., did the door open, did the camera take a picture, etc.). The security device information is optionally pushed or otherwise propagated to a security panel and/or to the server network database. The installer finishes the installation, and instructs the end user on how to create an account, username, and password. At this time the user enters the authorization key which validates the account creation (uses a valid authorization key to associate the network with the user's account). New devices may subsequently be added to the security network in a variety of ways (e.g., user first enters a unique ID for each device/sensor and names it in the server, after which the gateway can automatically discover and configure the device).

A description of another example embodiment follows in which the security system (FIG. 13, element 1310) is a Dialog system and the WSP (FIG. 13, element 1311) is a SimonXT available from General Electric Security, and the Gateway (FIG. 13, element 1320) is the iHub available from iControl Networks, Palo Alto, Calif., and described in detail herein. Descriptions of the install process for the SimonXT and iHub are also provided below.

GE Security's Dialog network is one of the most widely deployed and tested wireless security systems in the world. The physical RF network is based on a 319.5 MHz unlicensed spectrum, with a bandwidth supporting up to 19 Kbps communications. Typical use of this bandwidth—even in conjunction with the integrated security system—is far less than that. Devices on this network can support either one-way communication (either a transmitter or a receiver) or two-way communication (a transceiver). Certain GE Simon, Simon XT, and Concord security control panels incorporate a two-way transceiver as a standard component. The gateway also incorporates the same two-way transceiver card. The physical link layer of the network is managed by the transceiver module hardware and firmware, while the coded payload bitstreams are made available to the application layer for processing.

Sensors in the Dialog network typically use a 60-bit protocol for communicating with the security panel transceiver, while security system keypads and the gateway use the encrypted 80-bit protocol. The Dialog network is configured for reliability, as well as low-power usage. Many devices are supervised, i.e. they are regularly monitored by the system 'master' (typically a GE security panel), while still maintaining excellent power usage characteristics. A typical door window sensor has a battery life in excess of 5-7 years.

The gateway has two modes of operation in the Dialog network: a first mode of operation is when the gateway is configured or operates as a 'slave' to the GE security panel; a second mode of operation is when the gateway is configured or operates as a 'master' to the system in the event a security panel is not present. In both configurations, the gateway has the ability to 'listen' to network traffic, enabling the gateway to continually keep track of the status of all devices in the system. Similarly, in both situations the gateway can address and control devices that support setting adjustments (such as the GE wireless thermostat).

In the configuration in which the gateway acts as a 'slave' to the security panel, the gateway is 'learned into' the system as a GE wireless keypad. In this mode of operation, the gateway emulates a security system keypad when managing the security panel, and can query the security panel for status and 'listen' to security panel events (such as alarm events).

The gateway incorporates an RF Transceiver manufactured by GE Security, but is not so limited. This transceiver implements the Dialog protocols and handles all network message transmissions, receptions, and timing. As such, the physical, link, and protocol layers of the communications between the gateway and any GE device in the Dialog network are totally compliant with GE Security specifications.

At the application level, the gateway emulates the behavior of a GE wireless keypad utilizing the GE Security 80-bit encrypted protocol, and only supported protocols and network traffic are generated by the gateway. Extensions to the Dialog RF protocol of an embodiment enable full control and configuration of the panel, and iControl can both automate installation and sensor enrollment as well as direct configuration downloads for the panel under these protocol extensions.

As described above, the gateway participates in the GE Security network at the customer premises. Because the gateway has intelligence and a two-way transceiver, it can 'hear' all of the traffic on that network. The gateway makes use of the periodic sensor updates, state changes, and supervisory signals of the network to maintain a current state of the premises. This data is relayed to the integrated security system server (e.g., FIG. 2, element 260) and stored in the event repository for use by other server components. This usage of the GE Security RF network is completely non-invasive; there is no new data traffic created to support this activity.

The gateway can directly (or indirectly through the Simon XT panel) control two-way devices on the network. For example, the gateway can direct a GE Security Thermostat to change its setting to 'Cool' from 'Off', as well as request an update on the current temperature of the room. The gateway performs these functions using the existing GE Dialog protocols, with little to no impact on the network; a gateway device control or data request takes only a few dozen bytes of data in a network that can support 19 Kbps.

By enrolling with the Simon XT as a wireless keypad, as described herein, the gateway includes data or information of all alarm events, as well as state changes relevant to the security panel. This information is transferred to the gateway as encrypted packets in the same way that the information is transferred to all other wireless keypads on the network.

Because of its status as an authorized keypad, the gateway can also initiate the same panel commands that a keypad can initiate. For example, the gateway can arm or disarm the panel using the standard Dialog protocol for this activity. Other than the monitoring of standard alarm events like other network keypads, the only incremental data traffic on the network as a result of the gateway is the infrequent remote arm/disarm events that the gateway initiates, or infrequent queries on the state of the panel.

The gateway is enrolled into the Simon XT panel as a 'slave' device which, in an embodiment, is a wireless keypad. This enables the gateway for all necessary functionality for operating the Simon XT system remotely, as well as combining the actions and information of non-security devices such as lighting or door locks with GE Security devices. The only resource taken up by the gateway in this scenario is one wireless zone (sensor ID).

The gateway of an embodiment supports three forms of sensor and panel enrollment/installation into the integrated security system, but is not limited to this number of enrollment/installation options. The enrollment/installation options of an embodiment include installer installation, kitting, and panel, each of which is described below.

Under the installer option, the installer enters the sensor IDs at time of installation into the integrated security system web portal or iScreen. This technique is supported in all configurations and installations.

Kits can be pre-provisioned using integrated security system provisioning applications when using the kitting option. At kitting time, multiple sensors are automatically associated with an account, and at install time there is no additional work required.

In the case where a panel is installed with sensors already enrolled (i.e. using the GE Simon XT enrollment process), the gateway has the capability to automatically extract the sensor information from the system and incorporate it into the user account on the integrated security system server.

The gateway and integrated security system of an embodiment uses an auto-learn process for sensor and panel enrollment in an embodiment. The deployment approach of an embodiment can use additional interfaces that GE Security is adding to the Simon XT panel. With these interfaces, the gateway has the capability to remotely enroll sensors in the panel automatically. The interfaces include, but are not limited to, the following: EnrollDevice(ID, type, name, zone, group); SetDeviceParameters(ID, type, Name, zone, group), GetDeviceParameters(zone); and RemoveDevice(zone).

The integrated security system incorporates these new interfaces into the system, providing the following install process. The install process can include integrated security system logistics to handle kitting and pre-provisioning. Pre-kitting and logistics can include a pre-provisioning kitting tool provided by integrated security system that enables a security system vendor or provider ("provider") to offer pre-packaged initial 'kits'. This is not required but is recommended for simplifying the install process. This example assumes a 'Basic' kit is preassembled and includes one (1) Simon XT, three (3) Door/window sensors, one (1) motion sensor, one (1) gateway, one (1) keyfob, two (2) cameras, and ethernet cables. The kit also includes a sticker page with all Zones (1-24) and Names (full name list).

The provider uses the integrated security system kitting tool to assemble 'Basic' kit packages. The contents of different types of starter kits may be defined by the provider. At the distribution warehouse, a worker uses a bar code scanner to scan each sensor and the gateway as it is packed into the box. An ID label is created that is attached to the box. The scanning process automatically associates all the devices with one kit, and the new ID label is the unique identifier of the kit. These boxes are then sent to the provider for distribution to installer warehouses. Individual sensors, cameras, etc. are also sent to the provider installer warehouse. Each is labeled with its own barcode/ID.

An installation and enrollment procedure of a security system including an gateway is described below as one example of the installation process.

1. Order and Physical Install Process
   a. Once an order is generated in the iControl system, an account is created and an install ticket is created and sent electronically to the provider for assignment to an installer.
   b. The assigned installer picks up his/her ticket(s) and fills his/her truck with Basic and/or Advanced starter kits. He/she also keeps a stock of individual sensors, cameras, iHubs, Simon XTs, etc. Optionally, the installer can also stock homeplug adapters for problematic installations.
   c. The installer arrives at the address on the ticket, and pulls out the Basic kit. The installer determines sensor locations from a tour of the premises and discussion with the homeowner. At this point assume the homeowner requests additional equipment including an extra camera, two (2) additional door/window sensors, one (1) glass break detector, and one (1) smoke detector.
   d. Installer mounts SimonXT in the kitchen or other location in the home as directed by the homeowner, and routes the phone line to Simon XT if available. GPRS and Phone numbers pre-programmed in SimonXT to point to the provider Central Monitoring Station (CMS).
   e. Installer places iHub in the home in the vicinity of a router and cable modem. Installer installs an ethernet line from iHub to router and plugs iHub into an electrical outlet.

2. Associate and Enroll iHub into SimonXT
   a. Installer uses either his/her own laptop plugged into router, or homeowners computer to go to the integrated security system web interface and log in with installer ID/pass.
   b. Installer enters ticket number into admin interface, and clicks 'New Install' button. Screen prompts installer for kit ID (on box's barcode label).
   c. Installer clicks 'Add SimonXT'. Instructions prompt installer to put Simon XT into install mode, and add iHub as a wireless keypad. It is noted that this step is for security only and can be automated in an embodiment.
   d. Installer enters the installer code into the Simon XT. Installer Learns 'iHub' into the panel as a wireless keypad as a group 1 device.
   e. Installer goes back to Web portal, and clicks the 'Finished Adding SimonXT' button.
3. Enroll Sensors into SimonXT via iControl
   a. All devices in the Basic kit are already associated with the user's account.
   b. For additional devices, Installer clicks 'Add Device' and adds the additional camera to the user's account (by typing in the camera ID/Serial #).
   c. Installer clicks 'Add Device' and adds other sensors (two (2) door/window sensors, one (1) glass break sensor, and one (1) smoke sensor) to the account (e.g., by typing in IDs).
   d. As part of Add Device, Installer assigns zone, name, and group to the sensor. Installer puts appropriate Zone and Name sticker on the sensor temporarily.
   e. All sensor information for the account is pushed or otherwise propagated to the iConnect server, and is available to propagate to CMS automation software through the CMS application programming interface (API).
   f. Web interface displays 'Installing Sensors in System . . . ' and automatically adds all of the sensors to the Simon XT panel through the GE RF link.
   g. Web interface displays 'Done Installing'→all sensors show green.
4. Place and Tests Sensors in Home
   a. Installer physically mounts each sensor in its desired location, and removes the stickers.
   b. Installer physically mounts WiFi cameras in their location and plugs into AC power. Optional fishing of low voltage wire through wall to remove dangling wires. Camera transformer is still plugged into outlet but wire is now inside the wall.
   c. Installer goes to Web interface and is prompted for automatic camera install. Each camera is provisioned as a private, encrypted Wifi device on the iHub secured sandbox network, and firewall NAT traversal is initiated. Upon completion the customer is prompted to test the security system.
   d. Installer selects the 'Test System' button on the web portal—the SimonXT is put into Test mode by the iHub over GE RF.
   e. Installer manually tests the operation of each sensor, receiving an audible confirmation from SimonXT.
   f. iHub sends test data directly to CMS over broadband link, as well as storing the test data in the user's account for subsequent report generation.
   g. Installer exits test mode from the Web portal.
5. Installer instructs customer on use of the Simon XT, and shows customer how to log into the iControl web and mobile portals. Customer creates a username/password at this time.
6. Installer instructs customer how to change Simon XT user code from the Web interface. Customer changes user code which is pushed to SimonXT automatically over GE RF.

An installation and enrollment procedure of a security system including an gateway is described below as an alternative example of the installation process. This installation process is for use for enrolling sensors into the SimonXT and integrated security system and is compatible with all existing GE Simon panels.

The integrated security system supports all pre-kitting functionality described in the installation process above. However, for the purpose of the following example, no kitting is used.

1. Order and Physical Install Process
   a. Once an order is generated in the iControl system, an account is created and an install ticket is created and sent electronically to the security system provider for assignment to an installer.
   b. The assigned installer picks up his/her ticket(s) and fills his/her truck with individual sensors, cameras, iHubs, Simon XTs, etc. Optionally, the installer can also stock homeplug adapters for problematic installations.
   c. The installer arrives at the address on the ticket, and analyzes the house and talks with the homeowner to determine sensor locations. At this point assume the homeowner requests three (3) cameras, five (5) door/window sensors, one (1) glass break detector, one (1) smoke detector, and one (1) keyfob.
   d. Installer mounts SimonXT in the kitchen or other location in the home. The installer routes a phone line to Simon XT if available. GPRS and Phone numbers are pre-programmed in SimonXT to point to the provider CMS.
   e. Installer places iHub in home in the vicinity of a router and cable modem, and installs an ethernet line from iHub to the router, and plugs iHub into an electrical outlet.
2. Associate and Enroll iHub into SimonXT
   a. Installer uses either his/her own laptop plugged into router, or homeowners computer to go to the integrated security system web interface and log in with an installer ID/pass.
   b. Installer enters ticket number into admin interface, and clicks 'New Install' button. Screen prompts installer to add devices.
   c. Installer types in ID of iHub, and it is associated with the user's account.
   d. Installer clicks 'Add Device' and adds the cameras to the user's account (by typing in the camera ID/Serial #).
   e. Installer clicks 'Add SimonXT'. Instructions prompt installer to put Simon XT into install mode, and add iHub as a wireless keypad.
   f. Installer goes to Simon XT and enters the installer code into the Simon XT. Learns 'iHub' into the panel as a wireless keypad as group 1 type sensor.
   g. Installer returns to Web portal, and clicks the 'Finished Adding SimonXT' button.
   h. iHub now is alerted to all subsequent installs over the security system RF.
3. Enroll Sensors into SimonXT via iControl
   a. Installer clicks 'Add Simon XT Sensors'—Displays instructions for adding sensors to Simon XT.
   b. Installer goes to Simon XT and uses Simon XT install process to add each sensor, assigning zone, name, group. These assignments are recorded for later use.

c. The iHub automatically detects each sensor addition and adds the new sensor to the integrated security system.
d. Installer exits install mode on the Simon XT, and returns to the Web portal.
e. Installer clicks 'Done Adding Devices'.
f. Installer enters zone/sensor naming from recorded notes into integrated security system to associate sensors to friendly names.
g. All sensor information for the account is pushed to the iConnect server, and is available to propagate to CMS automation software through the CMS API.

4. Place and Tests Sensors in Home
   a. Installer physically mounts each sensor in its desired location.
   b. Installer physically mounts Wifi cameras in their location and plugs into AC power. Optional fishing of low voltage wire through wall to remove dangling wires. Camera transformer is still plugged into outlet but wire is now inside the wall.
   c. Installer puts SimonXT into Test mode from the keypad.
   d. Installer manually tests the operation of each sensor, receiving an audible confirmation from SimonXT.
   e. Installer exits test mode from the Simon XT keypad.
   f. Installer returns to web interface and is prompted to automatically set up cameras. After waiting for completion cameras are now provisioned and operational.

5. Installer instructs customer on use of the Simon XT, and shows customer how to log into the integrated security system web and mobile portals. Customer creates a username/password at this time.

6. Customer and Installer observe that all sensors/cameras are green.

7. Installer instructs customer how to change Simon XT user code from the keypad. Customer changes user code and stores in SimonXT.

8. The first time the customer uses the web portal to Arm/Disarm system the web interface prompts the customer for the user code, which is then stored securely on the server. In the event the user code is changed on the panel the web interface once again prompts the customer.

The panel of an embodiment can be programmed remotely. The CMS pushes new programming to SimonXT over a telephone or GPRS link. Optionally, iControl and GE provide a broadband link or coupling to the gateway and then a link from the gateway to the Simon XT over GE RF.

As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, mainframe computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The integrated security system can be a component of a single system, multiple systems, and/or geographically separate systems. The integrated security system can also be a subcomponent or subsystem of a single system, multiple systems, and/or geographically separate systems. The integrated security system can be coupled to one or more other components (not shown) of a host system or a system coupled to the host system.

One or more components of the integrated security system and/or a corresponding system or application to which the integrated security system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the integrated security system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Embodiments of the integrated security system include a system comprising: a gateway located at a first location; a connection management component coupled to the gateway, the connection management component automatically establishing a wireless coupling with a security system installed at the first location, the security system including security system components, wherein the connection management component forms a security network that integrates communications and functions of the security system components into the security network via the wireless coupling; and a security server at a second location different from the first location, wherein security server is coupled to the gateway.

The gateway of an embodiment is connected to a local area network at the first location, and the local area network is coupled to a wide area network via a router at the first location.

The gateway of an embodiment is coupled to a wide area network and is coupled to a local area network at the first location via the connection management component and a router at the first location.

The gateway of an embodiment is coupled to the security server via the internet.

The system of an embodiment comprises an interface coupled to the security network, wherein the interface allows control of the functions of the security network by a user.

The system of an embodiment comprises a portal coupled to the gateway, wherein the portal provides access to the communications and the functions of the security network via remote client devices.

The system of an embodiment comprises an interface coupled to the security network, wherein the interface allows control of the functions of the security network from the remote client devices.

The remote client devices of an embodiment include one or more of personal computers, personal digital assistants, cellular telephones, and mobile computing devices.

The gateway of an embodiment including the connection management component automatically discovers the security system components.

The gateway of an embodiment includes protocols of the security system from the security server and uses the protocols to discover the security system components.

The gateway of an embodiment requests and receives protocols of the security system from the security server, wherein the gateway uses the protocols received to discover the security system components.

The gateway of an embodiment including the connection management component automatically establishes and controls the communications with the security system components.

The gateway of an embodiment including the connection management component automatically establishes a coupling with the security system including the security system components.

The gateway of an embodiment includes a rules component that manages rules of interaction between the gateway and the security system components.

The gateway of an embodiment includes a device connect component that includes definitions of the security system components.

The security system of an embodiment is coupled to a central monitoring station via a primary communication link, wherein the gateway is coupled to the central monitoring station via a secondary communication link that is different than the primary communication link, wherein the central monitoring station is located at a third location different from the first location and the second location.

The gateway of an embodiment transmits event data of the security system components to the central monitoring station over the secondary communication link.

The event data of an embodiment comprises changes in device states of the security system components, data of the security system components, and data received by the security system components.

The secondary communication link of an embodiment includes a broadband coupling.

The secondary communication link of an embodiment includes a General Packet Radio Service (GPRS) coupling.

The gateway of an embodiment transmits messages comprising event data of the security system components to remote client devices over the secondary communication link.

The event data of an embodiment comprises changes in device states of the security system components, data of the security system components, and data received by the security system components.

The gateway of an embodiment receives control data for control of the security system components from remote client devices via the secondary communication link.

The security network of an embodiment comprises network devices coupled to the gateway via a wireless coupling.

The gateway of an embodiment including the connection management component automatically discovers the network devices.

The gateway of an embodiment including the connection management component automatically installs the network devices in the security network.

The gateway of an embodiment including the connection management component automatically configures the network devices for operation in the security network.

The gateway of an embodiment controls communications between the network devices, the security system components, and the security server.

The gateway of an embodiment including the connection management component transmits event data of the network devices to remote client devices over at least one of a plurality of communication links.

The gateway of an embodiment receives control data for control of the network devices from remote client devices via at least one of the plurality of communication links.

The event data of an embodiment comprises changes in device states of the network devices, data of the network devices, and data received by the network devices.

The security system of an embodiment is coupled to a central monitoring station via a primary communication link, wherein the gateway is coupled to the central monitoring station via a secondary communication link that is different than the primary communication link.

The gateway of an embodiment transmits event data of the network devices to the central monitoring station over the secondary communication link.

The secondary communication link of an embodiment includes a broadband coupling.

The secondary communication link of an embodiment includes a General Packet Radio Service (GPRS) coupling.

The gateway of an embodiment transmits messages comprising event data of the network devices to remote client devices over the secondary communication link.

The security server of an embodiment creates, modifies and terminates couplings between the gateway and the network devices.

The security server of an embodiment performs creation, modification, deletion and configuration of the network devices.

The security server of an embodiment creates automations, schedules and notification rules associated with the network devices.

The security server of an embodiment manages access to current and logged state data for the network devices.

The security server of an embodiment manages access to current and logged state data for couplings between the gateway and the network devices.

The security server of an embodiment manages communications with the network devices.

The network device of an embodiment is an Internet Protocol device.

The network device of an embodiment is a camera.

The network device of an embodiment is a touchscreen.

The network device of an embodiment is a device controller that controls an attached device.

The network device of an embodiment is a sensor.

The security server of an embodiment creates, modifies and terminates users corresponding to the security system.

The security server of an embodiment creates, modifies and terminates couplings between the gateway and the security system components.

The security server of an embodiment performs creation, modification, deletion and configuration of the security system components.

The security server of an embodiment creates automations, schedules and notification rules associated with the security system components.

The security server of an embodiment manages access to current and logged state data for the security system components.

The security server of an embodiment manages access to current and logged state data for couplings between the gateway and the security system components.

The security server of an embodiment manages communications with the security system components.

The security server of an embodiment generates and transfers notifications to remote client devices, the notifications comprising event data.

The notifications of an embodiment include one or more of short message service messages and electronic mail messages.

The event data of an embodiment is event data of the security system components.

The security server of an embodiment transmits event data of the security system components to a central monitoring station of the security system over the secondary communication link.

The security system components of an embodiment include one or more of sensors, cameras, input/output (I/O) devices, and accessory controllers.

Embodiments of the integrated security system include a security network comprising: a gateway including a connection management component located at a first location, the connection management component automatically establishing a wireless coupling with a security system installed at the first location, the security system including security system components, wherein the connection management component forms a security network that integrates communications and functions of the security system components into the security network via the wireless coupling; and a security server at a second location different from the first location, wherein security server is coupled to the gateway and includes a plurality of security network applications.

Embodiments of the integrated security system include a security network comprising: a gateway including a connection management component located at a first location; a wireless coupling between the gateway and a security system installed at the first location, wherein the security system includes a plurality of security system components that are proprietary to the security system, the connection management component automatically establishing the wireless coupling with the security system components and forming a security network that integrates communications and functions of the security system components into the security network; and an interface coupled to the gateway, the interface providing communications with the security network and control of the functions of the security network from a remote client device.

Embodiments of the integrated security system include a system comprising: a security network comprising a gateway coupled to a security system and located at a first location, the security system including a plurality of security system components, the security network comprising a plurality of premise devices coupled to the gateway, wherein the gateway electronically integrates communications and functions of the plurality of premise devices and the security system components; and a security server located at a second location different from the first location, the security server coupled to the security network via the gateway.

The system of an embodiment comprises an interface coupled to the security network, wherein the interface allows control of the functions of the security network by a user.

The system of an embodiment comprises a portal coupled to the gateway, wherein the portal provides access to the communications and the functions of the security network via remote client devices.

The system of an embodiment comprises an interface coupled to the security network, wherein the interface allows control of the functions of the security network from the remote client devices.

The remote client devices of an embodiment include one or more of personal computers, personal digital assistants, cellular telephones, and mobile computing devices.

The gateway of an embodiment automatically discovers the security system components.

The gateway of an embodiment includes protocols of the security system from the security server and uses the protocols to discover the security system components.

The gateway of an embodiment requests and receives protocols of the security system from the security server, wherein the gateway uses the protocols received to discover the security system components.

The gateway of an embodiment automatically establishes the communications with the security system components.

The gateway of an embodiment includes a connection management component, the connection management component automatically establishing a coupling with the security system including the security system components.

The connection management component of an embodiment automatically discovers the premise devices.

The connection management component of an embodiment automatically installs the premise devices in the security network.

The connection management component of an embodiment automatically configures the premise devices for operation in the security network. The gateway of an embodiment includes a rules component that manages rules of interaction between the gateway, the security system components, and the premise devices.

The gateway of an embodiment includes a device connect component that includes definitions of the security system components and the premise devices.

The gateway of an embodiment is connected to a premise local area network, and the premise local area network is coupled to a wide area network via a premise router/firewall.

The gateway of an embodiment is coupled to premise local area network via a premise router/firewall, and the gateway is coupled to a wide area network.

The gateway of an embodiment is coupled to the premise devices using a wireless coupling.

The gateway of an embodiment is coupled to the security server via the internet.

The gateway of an embodiment is coupled to a central monitoring station corresponding to the security system, wherein the central monitoring station is located at a third location different from the first location and the second location.

The security system of an embodiment is coupled to a central monitoring station via a primary communication link, wherein the gateway is coupled to the central monitoring station via a secondary communication link that is different than the primary communication link.

The gateway of an embodiment transmits event data of the security system components and the premise devices to the central monitoring station over the secondary communication link.

The event data of an embodiment comprises changes in device states of at least one of security system components and premise devices, data of at least one of security system components and premise devices, and data received by at least one of security system components and premise devices.

The gateway of an embodiment transmits event data of the security system to the central monitoring station over the secondary communication link when the primary communication link is unavailable.

The secondary communication link of an embodiment includes a broadband coupling.

The secondary communication link of an embodiment includes a General Packet Radio Service (GPRS) coupling.

The gateway of an embodiment transmits messages comprising event data of the security system components and the premise devices to remote client devices over the secondary communication link.

The event data of an embodiment comprises changes in device states of at least one of security system components and premise devices, data of at least one of security system components and premise devices, and data received by at least one of security system components and premise devices.

The security server of an embodiment creates, modifies and terminates users corresponding to the security system.

The security server of an embodiment creates, modifies and terminates couplings between the gateway and the security system components.

The security server of an embodiment creates, modifies and terminates couplings between the gateway and the premise devices.

The security server of an embodiment performs creation, modification, deletion and configuration of the security system components.

The security server of an embodiment performs creation, modification, deletion and configuration of the premise devices.

The security server of an embodiment creates automations, schedules and notification rules associated with the security system components.

The security server of an embodiment creates automations, schedules and notification rules associated with the premise devices.

The security server of an embodiment manages access to current and logged state data for the security system components.

The security server of an embodiment manages access to current and logged state data for the premise devices.

The security server of an embodiment manages access to current and logged state data for couplings among the gateway, the security system components and the IP devices.

The security server of an embodiment manages communications with the security system components.

The security server of an embodiment manages communications with the premise devices.

The security server of an embodiment generates and transfers notifications to remote client devices, the notifications comprising event data.

The notifications of an embodiment include one or more of short message service messages and electronic mail messages.

The event data of an embodiment is event data of the security system components.

The event data of an embodiment is event data of the premise devices.

The security server of an embodiment transmits event data of the security system components and the premise devices to a central monitoring station of the security system over the secondary communication link.

The security system components of an embodiment include one or more of sensors, cameras, input/output (I/O) devices, and accessory controllers.

The premise device of an embodiment is an Internet Protocol device.

The premise device of an embodiment is a camera.

The premise device of an embodiment is a touchscreen.

The premise device of an embodiment is a device controller that controls an attached device.

The premise device of an embodiment is a sensor.

Embodiments of the integrated security system include a system comprising: a security network comprising a gateway coupled to a security server, wherein the gateway is located at a first location and coupled to a security system, the security system including security system components located at the first location, wherein the security server is located at a second location different from the first location; and a plurality of premise devices located at the first location and coupled to the gateway, wherein the gateway electronically integrates communications and functions of the plurality of premise devices and the security system components into the security network.

Embodiments of the integrated security system include a security network comprising: a gateway, wherein the gateway is coupled to a security system that includes a plurality of security system components that are proprietary to the security system; a plurality of network devices coupled to the gateway, wherein the gateway forms a premise security network at a first location and couples the premise security network to a local area network of the first location, wherein the gateway forms the premise security network by electronically integrating communications and functions of the plurality of network devices and the security system components; and an application server located at a second location different from the first location, the application server coupled to the premise security network via the gateway and a communication network.

Embodiments of the integrated security system include a system comprising: a security network comprising a gateway coupled to a security server, wherein the gateway is located at a first location and coupled to a security system, the security system including security system components located at the first location, wherein the security server is located at a second location different from the first location; a plurality of premise devices located at the first location and coupled to the gateway, wherein the gateway electronically integrates communications and functions of the plurality of premise devices and the security system components into the security network; and an interface coupled to the gateway, the interface providing communications with the security network and control of the functions of the security system components and the premise devices from a remote client device.

Embodiments of the integrated security system include a method comprising: coupling a gateway comprising a connection management component to a local area network located in a first location and a security server in a second location; and forming a security network by automatically establishing a wireless coupling between the gateway and a security system using the connection management component, the security system comprising a plurality of security system components located at the first location, wherein forming the security network includes integrating communications and functions of the security system components into the security network via the wireless coupling.

The method of an embodiment comprises coupling the gateway to a local area network at the first location, wherein the local area network is coupled to a wide area network via a router at the first location.

The gateway of an embodiment is coupled to a wide area network and is coupled to a local area network at the first location via the connection management component and a router at the first location.

The gateway of an embodiment is coupled to the security server via the internet.

The method of an embodiment comprises providing an interface of the security network, wherein the interface allows control of the functions of the security network by a user.

The method of an embodiment comprises providing access to the communications and the functions of the security network via remote client devices and a portal coupled to the gateway.

The method of an embodiment comprises providing an interface coupled to the security network, wherein the interface allows control of the functions of the security network from the remote client devices.

The remote client devices of an embodiment include one or more of personal computers, personal digital assistants, cellular telephones, and mobile computing devices.

The gateway of an embodiment automatically discovers the security system components.

The method of an embodiment comprises using protocols of the security system to discover the security system components, wherein the gateway includes the protocols.

The method of an embodiment comprises requesting and receiving protocols of the security system from the security server, wherein the gateway receives and uses the protocols to discover the security system components.

The method of an embodiment comprises automatically establishing and controlling the communications with the security system components using the gateway.

The gateway of an embodiment including the connection management component automatically establishes a coupling with the security system including the security system components.

The gateway of an embodiment includes a rules component that manages rules of interaction between the gateway and the security system components.

The gateway of an embodiment includes a device connect component that includes definitions of the security system components.

The security system of an embodiment is coupled to a central monitoring station via a primary communication link, wherein the gateway is coupled to the central monitoring station via a secondary communication link that is different than the primary communication link, wherein the central monitoring station is located at a third location different from the first location and the second location.

The method of an embodiment comprises transmitting event data of the security system components from the gateway to the central monitoring station over the secondary communication link.

The event data of an embodiment comprises changes in device states of the security system components, data of the security system components, and data received by the security system components.

The secondary communication link of an embodiment includes a broadband coupling.

The secondary communication link of an embodiment includes a General Packet Radio Service (GPRS) coupling.

The gateway of an embodiment transmits messages comprising event data of the security system components to remote client devices over the secondary communication link.

The event data of an embodiment comprises changes in device states of the security system components, data of the security system components, and data received by the security system components.

The gateway of an embodiment receives control data for control of the security system components from remote client devices via the secondary communication link.

The security network of an embodiment comprises network devices coupled to the gateway via a wireless coupling.

The gateway of an embodiment including the connection management component automatically discovers the network devices.

The gateway of an embodiment including the connection management component automatically installs the network devices in the security network.

The gateway of an embodiment including the connection management component automatically configures the network devices for operation in the security network.

The gateway of an embodiment controls communications between the network devices, the security system components, and the security server.

The gateway of an embodiment including the connection management component transmits event data of the network devices to remote client devices over at least one of a plurality of communication links.

The gateway of an embodiment receives control data for control of the network devices from remote client devices via at least one of the plurality of communication links.

The event data of an embodiment comprises changes in device states of the network devices, data of the network devices, and data received by the network devices.

The security system of an embodiment is coupled to a central monitoring station via a primary communication link, wherein the gateway is coupled to the central monitoring station via a secondary communication link that is different than the primary communication link.

The gateway of an embodiment transmits event data of the network devices to the central monitoring station over the secondary communication link.

The secondary communication link of an embodiment includes a broadband coupling.

The secondary communication link of an embodiment includes a General Packet Radio Service (GPRS) coupling.

The gateway of an embodiment transmits messages comprising event data of the network devices to remote client devices over the secondary communication link.

The security server of an embodiment creates, modifies and terminates couplings between the gateway and the network devices.

The security server of an embodiment performs creation, modification, deletion and configuration of the network devices.

The security server of an embodiment creates automations, schedules and notification rules associated with the network devices.

The security server of an embodiment manages access to current and logged state data for the network devices.

The security server of an embodiment manages access to current and logged state data for couplings between the gateway and the network devices.

The security server of an embodiment manages communications with the network devices.

The network device of an embodiment is an Internet Protocol device.

The network device of an embodiment is a camera.

The network device of an embodiment is a touchscreen.

The network device of an embodiment is a device controller that controls an attached device.

The network device of an embodiment is a sensor.

The security server of an embodiment creates, modifies and terminates users corresponding to the security system.

The security server of an embodiment creates, modifies and terminates couplings between the gateway and the security system components.

The security server of an embodiment performs creation, modification, deletion and configuration of the security system components.

The security server of an embodiment creates automations, schedules and notification rules associated with the security system components.

The security server of an embodiment manages access to current and logged state data for the security system components.

The security server of an embodiment manages access to current and logged state data for couplings between the gateway and the security system components.

The security server of an embodiment manages communications with the security system components.

The security server of an embodiment generates and transfers notifications to remote client devices, the notifications comprising event data.

The notifications of an embodiment include one or more of short message service messages and electronic mail messages.

The event data of an embodiment is event data of the security system components.

The security server of an embodiment transmits event data of the security system components to a central monitoring station of the security system over the secondary communication link.

The security system components of an embodiment include one or more of sensors, cameras, input/output (I/O) devices, and accessory controllers.

Embodiments of the integrated security system include a method comprising: coupling a gateway comprising a connection management component to a local area network located at a facility; and forming a security network by automatically establishing a wireless coupling between the gateway and a security system using the connection management component, the security system comprising a plurality of security system components located at the facility, wherein forming the security network includes integrating communications and functions of the security system components into the security network via the wireless coupling.

Embodiments of the integrated security system include a method comprising: forming a security network, the forming including automatically establishing a wireless coupling between a gateway and a security system installed at a facility, wherein the security system includes a plurality of security system components that are proprietary to the security system, the forming including the gateway automatically integrating communications and functions of the security system components into a local area network of the facility; and providing an interface by which a remote client device accesses the security network, the interface enabling communications with and control of the functions of the security system.

Embodiments of the integrated security system include a method comprising: coupling a gateway to a local area network located in a first location and a security server in a second location, wherein the first location includes a security system comprising a plurality of security system components; automatically establishing communications between the gateway and the security system components; automatically establishing communications between the gateway and premise devices; and forming a security network by electronically integrating, via the gateway, communications and functions of the plurality of premise devices and the security system components.

The method of an embodiment comprises controlling the functions of the security network via an interface coupled to the security network, wherein the interface is accessed using a remote client device.

The remote client devices of an embodiment include one or more of personal computers, personal digital assistants, cellular telephones, and mobile computing devices.

The method of an embodiment comprises the gateway automatically discovering the security system components.

The method of an embodiment comprises using protocols of the security system to discover the security system components, wherein the gateway includes the protocols of the security system.

The method of an embodiment comprises the gateway receiving protocols of the security system from the security server in response to a request, wherein the gateway uses the protocols received to discover the security system components.

The gateway of an embodiment comprises a connection management component, the connection management component automatically establishing a coupling with the security system including the security system components.

The connection management component of an embodiment automatically discovers the premise devices.

The connection management component of an embodiment automatically installs the premise devices in the security network.

The connection management component of an embodiment automatically configures the premise devices for operation in the security network.

The gateway of an embodiment includes a rules component that manages rules of interaction between the gateway, the security system components, and the premise devices.

The gateway of an embodiment includes a device connect component that includes definitions of the security system components and the premise devices.

The premise local area network of an embodiment is coupled to a wide area network via a premise router.

The gateway of an embodiment is coupled to the local area network using a premise router, and the gateway is coupled to a wide area network.

The gateway of an embodiment is coupled to the premise devices using a wireless coupling.

The gateway of an embodiment is coupled to the security server via the internet.

The gateway of an embodiment is coupled to a central monitoring station corresponding to the security system, wherein the central monitoring station is located at a third location different from the first location and the second location.

The security system of an embodiment is coupled to a central monitoring station via a primary communication link, wherein the gateway is coupled to the central monitoring station via a secondary communication link that is different than the primary communication link.

The method of an embodiment comprises transmitting event data of the security system components and the premise devices to the central monitoring station via the gateway and the secondary communication link.

The event data of an embodiment comprises changes in device states of at least one of security system components and premise devices, data of at least one of security system components and premise devices, and data received by at least one of security system components and premise devices.

The method of an embodiment comprises transmitting event data of the security system to the central monitoring station via the gateway and the secondary communication link when the primary communication link is unavailable.

The secondary communication link of an embodiment includes a broadband coupling.

The secondary communication link of an embodiment includes a General Packet Radio Service (GPRS) coupling.

The method of an embodiment comprises transmitting messages comprising event data of the security system components and the premise devices to remote client devices via the gateway and the secondary communication link.

The event data of an embodiment comprises changes in device states of at least one of security system components and premise devices, data of at least one of security system components and premise devices, and data received by at least one of security system components and premise devices.

The security server of an embodiment creates, modifies and terminates users corresponding to the security system.

The security server of an embodiment creates, modifies and terminates couplings between the gateway and the security system components.

The security server of an embodiment creates, modifies and terminates couplings between the gateway and the premise devices.

The security server of an embodiment performs creation, modification, deletion and configuration of the security system components.

The security server of an embodiment performs creation, modification, deletion and configuration of the premise devices.

The security server of an embodiment creates automations, schedules and notification rules associated with the security system components.

The security server of an embodiment creates automations, schedules and notification rules associated with the premise devices.

The security server of an embodiment manages access to current and logged state data for the security system components.

The security server of an embodiment manages access to current and logged state data for the premise devices.

The security server of an embodiment manages access to current and logged state data for couplings among the gateway, the security system components and the IP devices.

The security server of an embodiment manages communications with the security system components.

The security server of an embodiment manages communications with the premise devices.

The security server of an embodiment generates and transfers notifications to remote client devices, the notifications comprising event data.

The notifications of an embodiment include one or more of short message service messages and electronic mail messages.

The event data of an embodiment is event data of the security system components.

The event data of an embodiment is event data of the premise devices.

The security server of an embodiment transmits event data of the security system components and the premise devices to a central monitoring station of the security system over the secondary communication link.

The security system components of an embodiment include one or more of sensors, cameras, input/output (I/O) devices, and accessory controllers.

The premise device of an embodiment is an Internet Protocol device.

The premise device of an embodiment is a camera.

The premise device of an embodiment is a touchscreen.

The premise device of an embodiment is a device controller that controls an attached device.

The premise device of an embodiment is a sensor.

Embodiments of the integrated security system include a method comprising: forming a security network by coupling a gateway to a security server, wherein the gateway is located at a first location and coupled to a security system, the security system including security system components located at the first location, wherein the security server is located at a second location different from the first location; and establishing a coupling between the gateway and a plurality of premise devices located at the first location, wherein the gateway electronically integrates communications and functions of the plurality of premise devices and the security system components into the security network.

Embodiments of the integrated security system include a method comprising: automatically establishing communications between a gateway and a security system in a facility, wherein the security system includes a plurality of security system components that are proprietary to the security system; and automatically establishing communications between the gateway and a plurality of network devices, wherein the gateway forms a premise security network at the facility and couples the premise security network to a local area network of the facility, wherein the gateway forms the premise security network by electronically integrating communications and functions of the plurality of network devices and the security system components.

Embodiments of the integrated security system include a method comprising: forming a security network by automatically establishing communications between a gateway and a security system, the security system including security system components installed at a facility; automatically establishing communications between the security network and a plurality of network devices located at the facility, the gateway electronically integrating communications and functions of the plurality of network devices and the security system components into the security network; and providing an interface by which a remote client device accesses the security network, the interface enabling communications with and control of the functions of the security system components and the network devices.

Aspects of the integrated security system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the integrated security system and corresponding systems and methods include: microcontrollers with memory (such as electronically erasable programmable read only memory (EEPROM)), embedded microprocessors, firmware, software, etc. Furthermore, aspects of the integrated security system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the integrated security system and corresponding systems and methods is not intended to be exhaustive or to limit the systems and methods to the precise forms disclosed. While specific embodiments of, and examples for, the integrated security system and corresponding systems and methods are described herein for illustrative purposes, various equivalent modifications are possible within the scope of the systems and methods, as those skilled in the relevant art will recognize. The teachings of the integrated security system and corresponding systems and methods provided herein can be applied to other systems and methods, not only for the systems and methods described above.

The elements and acts of the various embodiments described above can be combined to provide further embodiments. These and other changes can be made to the integrated security system and corresponding systems and methods in light of the above detailed description.

In general, in the following claims, the terms used should not be construed to limit the integrated security system and corresponding systems and methods to the specific embodiments disclosed in the specification and the claims, but should be construed to include all systems that operate under the claims. Accordingly, the integrated security system and corresponding systems and methods is not limited by the disclosure, but instead the scope is to be determined entirely by the claims.

While certain aspects of the integrated security system and corresponding systems and methods are presented below in certain claim forms, the inventors contemplate the various aspects of the integrated security system and corresponding systems and methods in any number of claim forms. Accordingly, the inventors reserve the right to add additional claims after filing the application to pursue such additional claim forms for other aspects of the integrated security system and corresponding systems and methods.

What is claimed is:

1. A method comprising:
coupling a gateway to a local area network located in a first location and a security server in a second location, wherein the first location includes a security system comprising a plurality of security system components;
automatically discovering the plurality of security system components at the gateway and establishing a first communication channel between the gateway and the plurality of security system components;
automatically discovering network devices at the gateway and establishing a second communication channel between the gateway and the network devices, wherein the second communication channel is independent of the first communication channel;
forming a security network by electronically integrating into the gateway communications and functions of the network devices and the plurality of security system components;
receiving at the gateway security data from the plurality of security system components, device data of the network devices, and remote data from the security server;
generating processed data by processing at the gateway the security data, the device data, and the remote data;
determining a state change of the security system using the processed data; and
maintaining at the security server with use of the processed data objects corresponding to the plurality of security system components and the network devices.

2. The method of claim 1, comprising controlling the functions of the security network via an interface coupled to the security network, wherein the interface is accessed using a remote client device.

3. The method of claim 2, wherein the remote client devices include one or more of personal computers, personal digital assistants, cellular telephones, and mobile computing devices.

4. The method of claim 1, comprising using protocols of the security system to discover the security system components, wherein the gateway includes the protocols of the security system.

5. The method of claim 1, comprising the gateway receiving protocols of the security system from the security server in response to a request, wherein the gateway uses the protocols received to discover the security system components.

6. The method of claim 1, wherein the gateway comprises a connection management component, the connection management component automatically establishing a coupling with the security system including the security system components.

7. The method of claim 6, wherein the connection management component automatically discovers the network devices.

8. The method of claim 6, wherein the connection management component automatically installs the network devices in the security network.

9. The method of claim 6, wherein the connection management component automatically configures the network devices for operation in the security network.

10. The method of claim 1, wherein the gateway includes a rules component that manages rules of interaction between the gateway, the security system components, and the network devices.

11. The method of claim 1, wherein the gateway includes a device connect component that includes definitions of the security system components and the network devices.

12. The method of claim 1, wherein the premise local area network is coupled to a wide area network via a premise router.

13. The method of claim 1, wherein the gateway is coupled to the local area network using a premise router, and the gateway is coupled to a wide area network.

14. The method of claim 1, wherein the gateway is coupled to the network devices using a wireless coupling.

15. The method of claim 1, wherein the gateway is coupled to the security server via the internet.

16. The method of claim 1, wherein the gateway is coupled to a central monitoring station corresponding to the security system, wherein the central monitoring station is located at a third location different from the first location and the second location.

17. The method of claim 1, wherein the security system is coupled to a central monitoring station via a third communication channel, wherein the gateway is coupled to the central monitoring station via a fourth communication channel that is different than the third communication channel.

18. The method of claim 17, comprising transmitting event data of the security system components and the network devices to the central monitoring station via the gateway and the fourth communication channel.

19. The method of claim 18, wherein the event data comprises changes in device states of at least one of security system components and network devices, data of at least one of security system components and network devices, and data received by at least one of security system components and network devices.

20. The method of claim 17, comprising transmitting event data of the security system to the central monitoring station via the gateway and the fourth communication channel when the third communication channel is unavailable.

21. The method of claim 17, wherein the fourth communication channel includes a broadband coupling.

22. The method of claim 17, wherein the fourth communication channel includes a General Packet Radio Service (GPRS) coupling.

23. The method of claim 17, comprising transmitting messages comprising event data of the security system components and the network devices to remote client devices via the gateway and the fourth communication channel.

24. The method of claim 23, wherein the event data comprises changes in device states of at least one of security system components and network devices, data of at least one of security system components and network devices, and data received by at least one of security system components and network devices.

25. The method of claim 1, wherein the security server creates, modifies and terminates users corresponding to the security system.

26. The method of claim 1, wherein the security server creates, modifies and terminates couplings between the gateway and the security system components.

27. The method of claim 1, wherein the security server creates, modifies and terminates couplings between the gateway and the plurality of premise network devices.

28. The method of claim 1, wherein the security server performs creation, modification, deletion and configuration of the security system components.

29. The method of claim 1, wherein the security server performs creation, modification, deletion and configuration of the network devices.

30. The method of claim 1, wherein the security server creates automations, schedules and notification rules associated with the security system components.

31. The method of claim 1, wherein the security server creates automations, schedules and notification rules associated with the network devices.

32. The method of claim 1, wherein the security server manages access to current and logged state data for the security system components.

33. The method of claim 1, wherein the security server manages access to current and logged state data for the network devices.

34. The method of claim 1, wherein the security server manages access to current and logged state data for couplings among the gateway, the security system components and the network devices.

35. The method of claim 1, wherein the security server manages communications with the security system components.

36. The method of claim 1, wherein the security server manages communications with the network devices.

37. The method of claim 1, wherein the security server generates and transfers notifications to remote client devices, the notifications comprising event data.

38. The method of claim 37, wherein the notifications include one or more of short message service messages and electronic mail messages.

39. The method of claim 37, wherein the event data is event data of the security system components.

40. The method of claim 37, wherein the event data is event data of the network devices.

41. The method of claim 1, wherein the security server transmits event data of the security system components and the network devices to a central monitoring station of the security system over the fourth communication channel.

42. The method of claim 1, wherein the security system components include one or more of sensors, cameras, input/output (I/O) devices, and accessory controllers.

43. The method of claim 1, wherein the network device is an Internet Protocol device.

44. The method of claim 1, wherein the network device is a camera.

45. The method of claim 1, wherein the network device is a touchscreen.

46. The method of claim 1, wherein the network device is a device controller that controls an attached device.

47. The method of claim 1, wherein the network device is a sensor.

48. A method comprising:

forming a security network by coupling a gateway to a security server, wherein the gateway is located at a first location and coupled to a security system that includes security system components located at the first location, wherein the security server is located at a second location different from the first location;

automatically discovering network devices at the gateway and establishing a coupling between the gateway and the network devices located at the first location, wherein the gateway electronically integrates communications and functions of the network devices and the security system components into the gateway and the security network;

receiving at the gateway security data from the security system components, device data of the network devices, and remote data from the security server;

generating processed data by processing at the gateway the security data, the device data, and the remote data;

determining a state change of the security system using the processed data; and maintaining at the security server with use of the processed data objects corresponding to the plurality of security system components and the network devices.

49. A method comprising:

automatically discovering a security system at a gateway and establishing communications between the gateway and the security system in a facility, wherein the security system includes a plurality of security system components that are proprietary to the security system;

automatically discovering a plurality of network devices at the gateway and establishing communications between the gateway and the plurality of network devices, wherein the gateway fauns a security network at the facility and couples the security network to a local area network of the facility, wherein the gateway forms the security network by electronically integrating into the gateway communications and functions of the plurality of network devices and the plurality of security system components;

receiving at the gateway security data from the plurality of security system components, device data of the plurality of network devices, and remote data from the remote server;

generating processed data by processing at the gateway the security data, the device data, and the remote data;

determining a state change of the security system using the processed data; and maintaining at the remote server with use of the processed data objects corresponding to the plurality of security system components and the plurality of network devices.

50. A method comprising:

forming a security network by automatically discovering a security system at a gateway and establishing communications between the gateway and the security system, the security system including security system components installed at a facility, wherein the gateway is located at a first location, wherein the gateway is coupled to a security server at a second location different than the first location;

automatically discovering a plurality of network devices at the gateway and establishing communications between the security network and the plurality of network devices located at the facility, the gateway electronically integrating communications and functions of the plurality of network devices and the security system components into the gateway and the security network;

receiving at the gateway security data from the security system components, device data of the plurality of network devices, and remote data from the security server;

generating processed data by processing at the gateway the security data, the device data, and the remote data;

determining a state change of the security system using the processed data;

maintaining at the security server with use of the processed data objects corresponding to the plurality of security system components and the network devices; and providing an interface by which a remote client device accesses the security network, the interface enabling communications with and control of the functions of the security system components and the plurality of network devices.

* * * * *